United States Patent

Ihara

(10) Patent No.: US 9,591,283 B2
(45) Date of Patent: Mar. 7, 2017

(54) ENCODING APPARTUS, DECODING APPARATUS, ENCODING METHOD, AND DECODING METHOD

(71) Applicant: FUJITSU LIMITED, Kawasaki-shi, Kanagawa (JP)

(72) Inventor: Noriyuki Ihara, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 414 days.

(21) Appl. No.: 14/456,742

(22) Filed: Aug. 11, 2014

(65) Prior Publication Data

US 2014/0348248 A1 Nov. 27, 2014

Related U.S. Application Data

(63) Continuation of application No. PCT/JP2012/056946, filed on Mar. 17, 2012.

(51) Int. Cl.
*H04N 7/12* (2006.01)
*H04N 13/00* (2006.01)
(Continued)

(52) U.S. Cl.
CPC ..... *H04N 13/0051* (2013.01); *H04N 13/0048* (2013.01); *H04N 21/242* (2013.01);
(Continued)

(58) Field of Classification Search
CPC .......... H04N 13/0051; H04N 13/0048; H04N 21/242; H04N 21/4305; H04N 21/8456; H04N 21/854
(Continued)

(56) References Cited

U.S. PATENT DOCUMENTS 5,809,176 A 9/1998 Yajima
6,870,883 B2 3/2005 Iwata
(Continued)

FOREIGN PATENT DOCUMENTS

JP 8-79701 A 3/1996
JP 10-234043 A 9/1998
(Continued)

OTHER PUBLICATIONS

U.S. Office Action mailed Jul. 14, 2016 for U.S. Appl. No. 14/242,426, 28 pages.
(Continued)

*Primary Examiner* — Allen Wong
(74) *Attorney, Agent, or Firm* — Fujitsu Patent Center

(57) ABSTRACT

A master encoder obtains in time series one of divided images obtained by dividing an original image into a plurality of sections, obtains identification time for identification of the divided image obtained in time series, and notifies the slave encoder of the identification time, encodes the obtained divided image and generate an encoded divided image, and generates encoding transmission information including in time series encoding information including the encoded divided image and the identification time, and transmits the encoding information. A slave encoder obtains in time series any other than the one of divided image, obtains the identification time set for identification of the divided image from the master encoder, encodes the obtained divided image and generate an encoded divided image, and generates encoding transmission information including in time series encoding information including the encoded divided image and the identification time, and transmit the encoding information.

16 Claims, 20 Drawing Sheets

(51) Int. Cl.
*H04N 21/242* (2011.01)
*H04N 21/43* (2011.01)
*H04N 21/845* (2011.01)
*H04N 21/854* (2011.01)

(52) U.S. Cl.
CPC ..... *H04N 21/4305* (2013.01); *H04N 21/8456* (2013.01); *H04N 21/854* (2013.01)

(58) Field of Classification Search
USPC .................................................. 375/240.26
See application file for complete search history.

(56) References Cited

U.S. PATENT DOCUMENTS

| | | |
|---|---|---|
| 2002/0031184 A1 | 3/2002 | Iwata |
| 2005/0147174 A1 | 7/2005 | Iwata |
| 2006/0033840 A1* | 2/2006 | Diehl ..................... H04N 7/163 348/468 |
| 2006/0171600 A1 | 8/2006 | Kikuchi |
| 2007/0104277 A1 | 5/2007 | Kikuchi |
| 2007/0104455 A1 | 5/2007 | Kikuchi |
| 2008/0152020 A1 | 6/2008 | Kayashima et al. |
| 2010/0220792 A1 | 9/2010 | Kamito et al. |
| 2011/0013849 A1* | 1/2011 | Saito ...................... H04N 19/61 382/233 |
| 2011/0216819 A1* | 9/2011 | Guyot ................ H04N 21/2221 375/240.02 |

FOREIGN PATENT DOCUMENTS

| | | |
|---|---|---|
| JP | 11-239347 A | 8/1999 |
| JP | 2002-125203 A | 4/2002 |
| JP | 2008-166862 A | 7/2008 |
| JP | 2010-278983 A | 12/2010 |
| JP | 2010-279082 A | 12/2010 |
| WO | 2009/063554 A1 | 5/2009 |

OTHER PUBLICATIONS

U.S. Office Action mailed Jan. 11, 2016 for U.S. Appl. No. 14/242,426, 26 pages.
International Search Report, mailed in connection with PCT/JP2012/056946 and mailed on Jun. 19, 2012(Total number of pages: 3).
Japanese Office Action mailed Dec. 6, 2016, for corresponding Japanese Patent Application No. 2013-082332, with Partial English Translation, 11 pages.

* cited by examiner

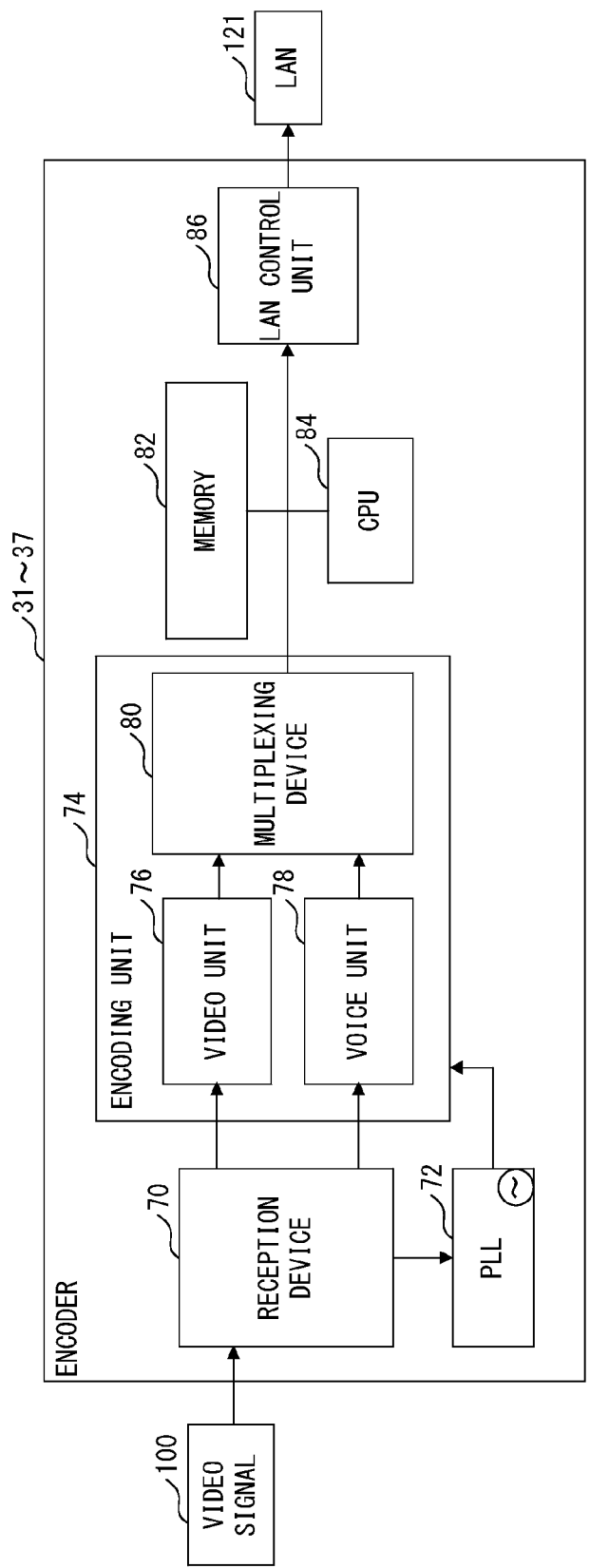
F I G. 3

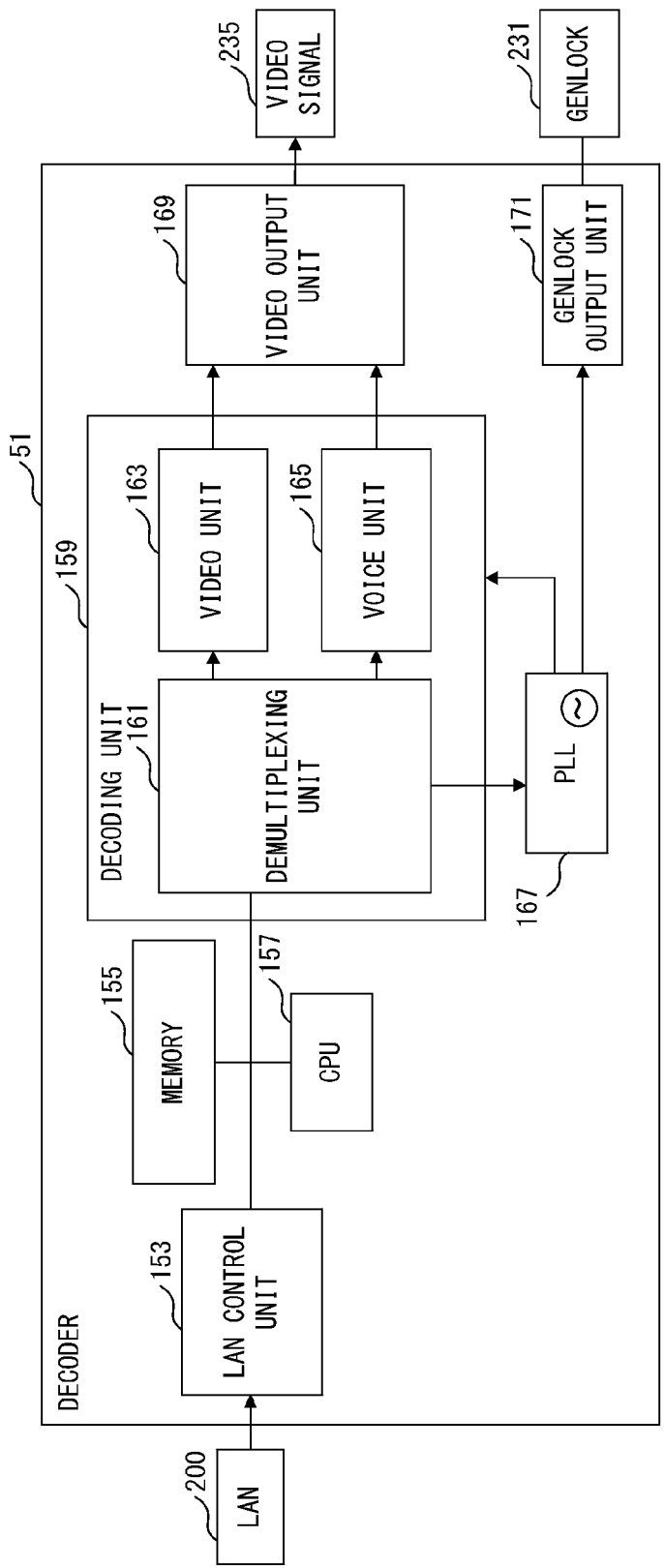
F I G. 6

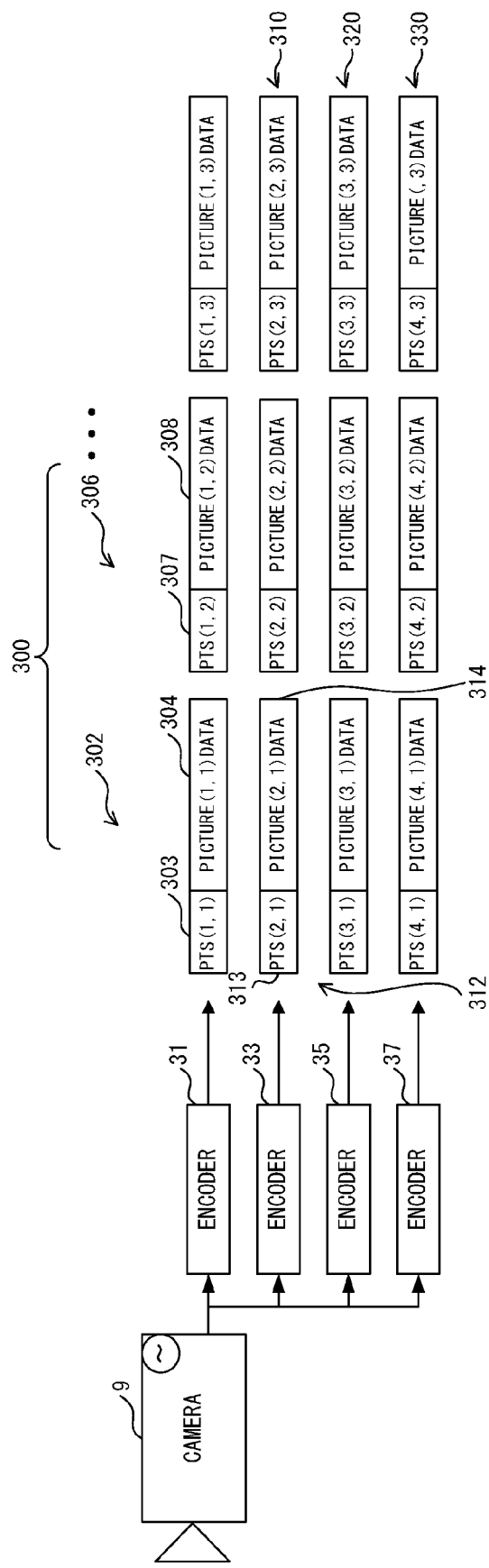
F I G. 10

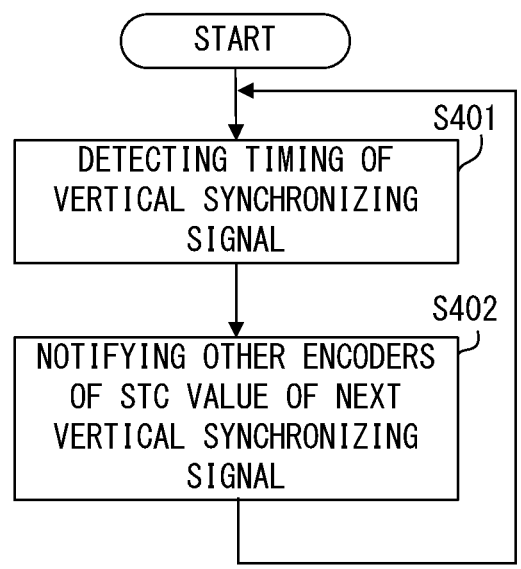
F I G. 1 4

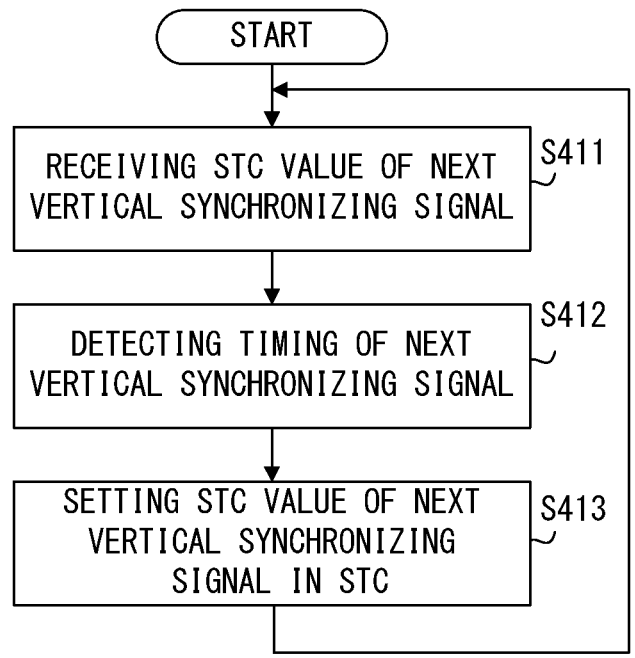
F I G. 15

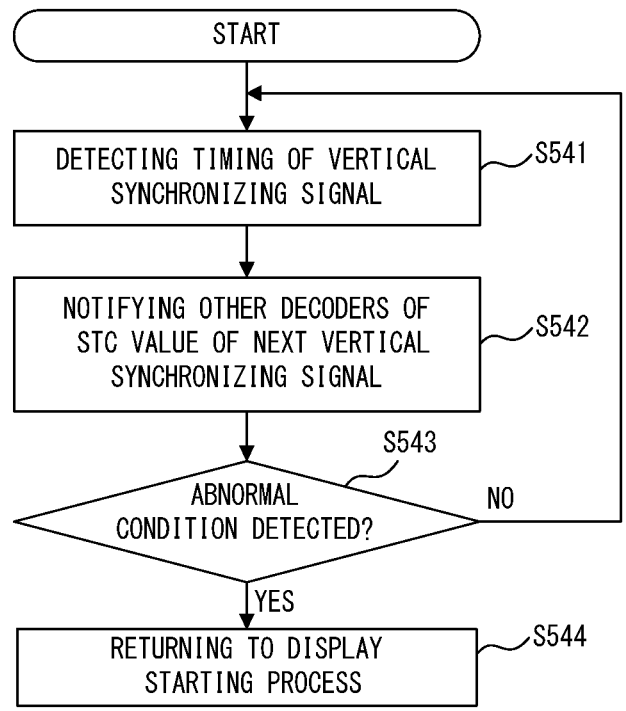
F I G. 1 8

ENCODING APPARTUS, DECODING APPARATUS, ENCODING METHOD, AND DECODING METHOD

CROSS-REFERENCE TO RELATED APPLICATION

This application is a continuation application of International Application PCT/JP2012/056946 filed on Mar. 17, 2012 and designated the U.S., the entire contents of which are incorporated herein by reference.

FIELD

The embodiments discussed herein are related to an encoding apparatus, a decoding apparatus, an encoding method, and a decoding method.

BACKGROUND

At present, there is a small number of types of CODEC capable of compressing and transmitting an image in 4K2K size (for Hi-Vision which is four times as high as the resolution of 1920×1080) used for digital cinema or in super-Hi-Vision size (16 times as high as Hi-Vision) using one device, and the device is expensive. Therefore, when an image of the 4K2K size or super-Hi-Vision size (hereafter referred to as a super-high-definition image) is transmitted, there is a demand to divide the image into 4 or 16 sections and transmit them using a plurality of inexpensive Hi-Vision codec units. Furthermore, there is a demand to realize the transmission of the super-Hi-Vision image using the Internet protocol (IP) network which is inexpensive in line cost. As a similar divisional transmission, there is also a demand to transmit left and right images in a 3-dimensional (3D) image as Hi-Vision images.

There is an example as another system of calculating as a first time a value obtained by adding a commonly determined encode delay time to a system time clock (STC) counter value in each of a plurality of encoding apparatus. In this example, the stream generated including the first time is transmitted to an encoding apparatus associated one to one with the encoding apparatus. In this system, a decoding apparatus adds a decoding delay time to the value of stream fluctuation, and defines as the second time the value obtained by adding the first time to the maximum value determined commonly among a plurality of decoding apparatus as a value which is assumed as the maximum sum. The decoding apparatus outputs decoded image data to a composition unit which composes image data at the second time.
[Patent Document 1] Japanese Laid-open Patent Publication No. 2010-279082

SUMMARY

According to an aspect of the embodiments, an encoding apparatus, includes a master encoder and at least one slave encoder, wherein the master encoder is configured to obtain in time series one of divided images obtained by dividing an original image into a plurality of sections; obtain identification time for identification of the divided image obtained in time series, and notify the slave encoder of the identification time; encode the obtained divided image and generate an encoded divided image, and generate encoding transmission information including in time series encoding information including the encoded divided image and the identification time; and transmit the encoding information; and at least one of the slave encoder is configured to obtain in time series any other than the one of divided image; obtain the identification time set for identification of the divided image from the master encoder; encode the obtained divided image and generate an encoded divided image, and generate encoding transmission information including in time series encoding information including the encoded divided image and the identification time; and transmit the encoding information.

The object and advantages of the invention will be realized and attained by means of the elements and combinations particularly pointed out in the claims.

It is to be understood that both the foregoing general description and the following detailed description are exemplary and explanatory and are restrictive of the invention.

BRIEF DESCRIPTION OF DRAWINGS

FIG. 3 is a configuration of the hardware of the encoder according to an embodiment of the present invention;

FIG. 6 is a block diagram of the configuration of the hardware of the decoder according to an embodiment of the present invention;

FIG. 10 illustrates the concept of the TS stream when the STC synchronization of the PTS according to an embodiment of the present invention is not performed;

FIG. 14 is a flowchart of the operation of the encoder according to an embodiment of the present invention;

FIG. 15 is a flowchart of the operation of the encoder according to an embodiment of the present invention;

FIG. 18 is a flowchart of the operation of the decoder during the playback according to an embodiment of the present invention.

DESCRIPTION OF EMBODIMENTS

Figure 1:
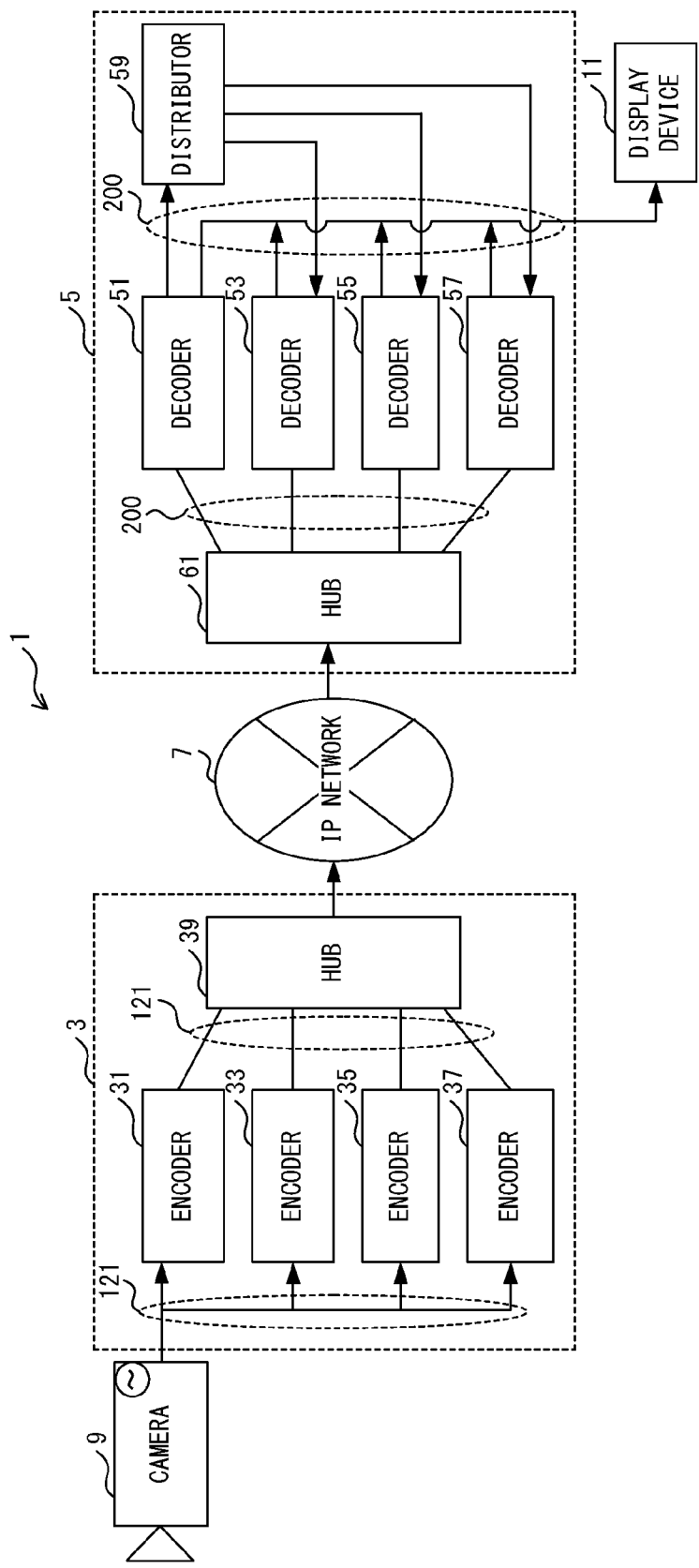
FIG. 1 is a configuration of the image transmission system according to an embodiment of the present invention.

When images are transmitted using a plurality of devices, a decoder synchronizes received frames of the images of each encoder and playbacks the images. However, the output of the decoder of divided images is not synchronized by dividing an image, compressing the image and voice by a plurality of encoders, transmitting the compressed data over an IP network, and composing an output image by a decoder. Because there are differences in encoding and decoding delays and transmission delays over a network.

To synchronize the divided images of a decoder, an encoder may add a counter value etc. to a divided image, a decoder may decode a transmitted image, and a screen may be composed and displayed with matching counter values. However, the display timing of divided images is not constant, and an image is not output at a correct frame rate of, for example, 29.97 Hz which is used in the broadcast industry.

Therefore, to divide an image and transmit the divided image by a plurality of encoders and decoders at a correct rate available in the broadcast industry, it is preferably to perform the transmission by an image and voice multiplexing system capable of transmitting a correct display clock widely used in the broadcast industry. For example, the moving picture exports group-transport stream (MPEG2-TS) system is used.

In the case above, a plurality of encoders compress images and voice with H.264, MPEG2, etc./MPEG1-layer 2, advanced audio coding (AAC), high efficiency (HE)-AAC etc. Furthermore, the encoder transmits compressed data by the MPEG2-TS system. In this case, to perform the playback with all images synchronized by the decoder, it is preferable that the delays in the network match between all encoders and decoders.

When the digital video broadcasting-asynchronous serial interface (DVB-ASI), which is widely used in the broadcast industry, is used, it is assumed that the transmission speed of a network is constant. Therefore, the transmission speed may be identical in all encoders and decoders.

However, when the DVB-ASI is simply replaced with an IP network, a plurality of divided images are transmitted as separate IP streams, and the delay of each stream is different. Therefore, the images simultaneously transmitted by the encoder are not simultaneously played back, thereby failing in synchronously playing back the plurality of images.

Therefore, there is the technology of transmitting the output from each encoder by the DVB-ASI collectively as one stream over the IP network, decomposing it into the DVB-ASI on the reception side, thereby equalizing the delay in the IP network between all encoders and decoders.

Specifically, each transport stream (TS) is output from each encoder by the DVB-ASI, multiplexed into one TS stream by a multiplex (MUX) device, and output by the DVB-ASI. Then, the DVB-ASI-IP converter transmits the TS stream over the IP network, the IP-DVB-ASI converter receives the TS stream on the IP network, and outputs it by the DVB-ASI. Further, a demultiplexer (DEMUX) decomposes an image into each TS stream, and inputs the stream ti each decoder. Thus, since the data is transmitted as one stream in the IP network, the delay of each TS stream received by the decoder is identical, thereby synchronously playing back all images by the decoder.

However, there is following problem when the output from each encoder by the DVB-ASI is combined into one stream. That is, as compared with the case in which a transmission is performed by the DVB-ASI, used is an expensive system which additionally requires an MUX device, a DVB-ASI-IP conversion device, an IP-DVB-ASI conversion device, a DEMUX device, etc.

In each of a plurality of encoding apparatus, there is the problem with the system in which the value obtained by adding a commonly determined encoding delay time to an STC counter value is defined as a first time, and the value obtained by adding the first time to the maximum value commonly determined among the plurality of decoding apparatus is defined as a second time. That is, in a system in which there is the possibility that the transmission speed is different for each piece of information as in the IP network, there may be the case in which it is not determined from which image the information transmitted from the encoding apparatus is encoded. Furthermore, it is also difficult to determine the maximum value of encoding delay.

An embodiment is described below with reference to the attached drawings. Assume that a video signal refers to a signal including the image and the voice output from a camera, or a signal including the image and the voice input into the display device while video information and voice information refer to the information corresponding respectively to the video part and the voice part obtained separately from the video signal. Also assume that picture data refers to the information corresponding to one picture encoded from the video information and encoded picture refers to the information obtained by adding a presentation time stamp (PTS) value to the picture data. Further assume that encoded voice refers to the information obtained by compressing and encoding voice information. Also assume that a stream refers to the information including a series of encoded pictures, the encoded voice, and a program clock reference (PCR) as a reference time used when the decoding operation is performed.

Figure 2:
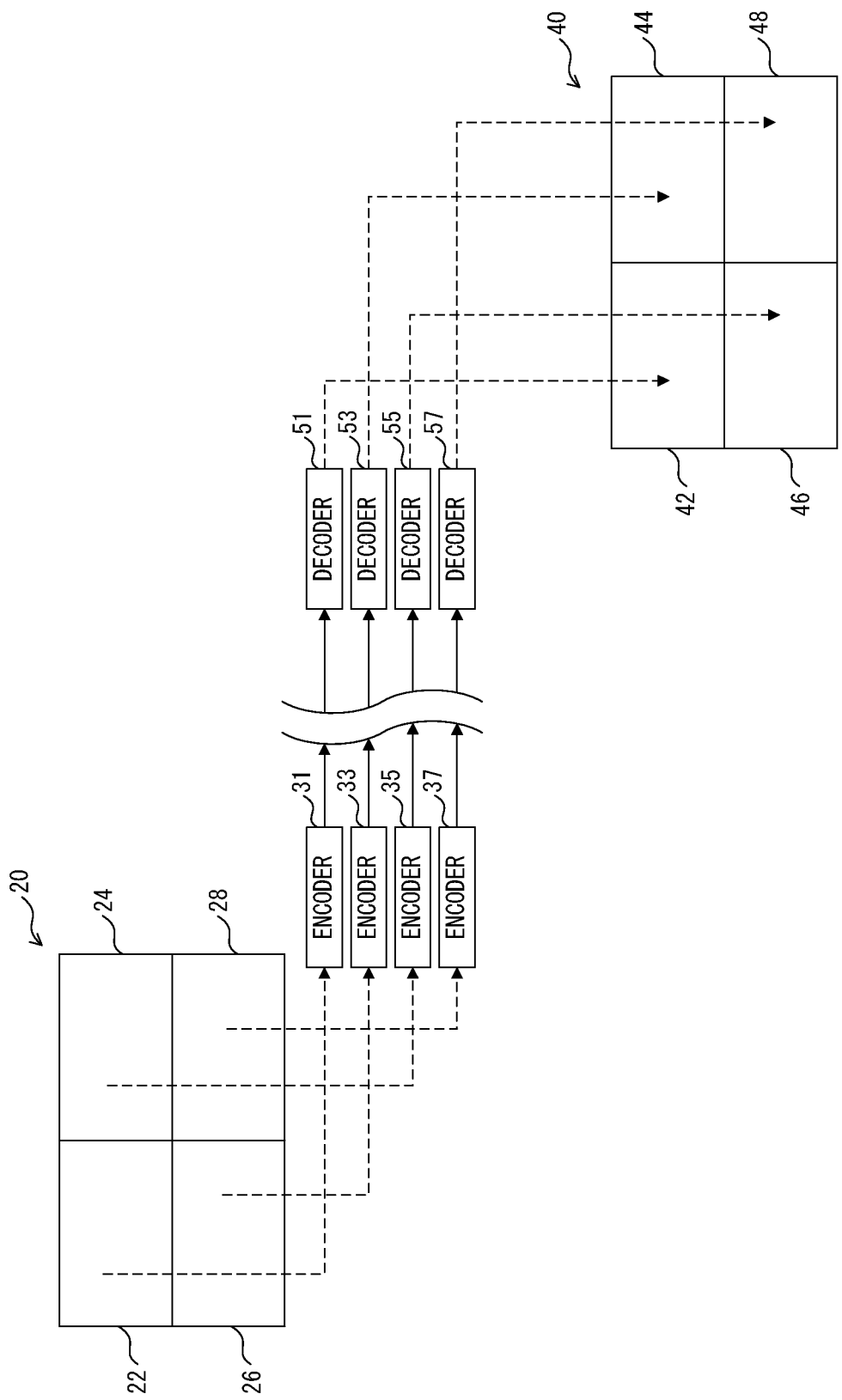
FIG. 2 illustrates the concept of the operation of the image transmission system according to an embodiment of the present invention.

FIG. 1 is a configuration of an image transmission system 1 according to the embodiment. FIG. 2 illustrates the concept of the operation of the image transmission system 1. As illustrated in FIG. 1, the image transmission system 1 is a system obtained by connecting an encoding apparatus 3 to which a camera 9 is connected, and a decoding apparatus 5 to which a display device 11 is connected through an IP network 7. The image transmission system 1 divides an image of the 4K2K size, such a super high definition image that is greater than or equal to the 4K2K size, 3D , or the like. The image transmission system 1 encodes the divided images transmits the divided images in real time using the IP network 7, and plays back the image by synchronization using a decoding apparatus. According to the present embodiment, video information is transmitted by, for example, a moving picture experts group 2-transport stream (MPEG2-TS).

The encoding apparatus 3 according to the present embodiment includes four encoders 31 through 37, and a HUB 39. As illustrated in FIGS. 1 and 2, the encoders 31 through 37 are encoding apparatus which encode divided images 22 through 28 obtained by dividing an original image 20, and output them as a stream. The HUB 39 transmits information collectively using a plurality of cables. The camera 9 is a photograph device which divides, for example, a 4K2K video signal into a plurality of divided images and outputs them.

Each of the encoders 31 through 37 is connected to one camera 9, and obtains a video signal quartered by the camera 9. Since the encoders 31 through 37 perform encoding in synchronization with one camera 9, the timing of the vertical synchronizing signal (Vsync) of each picture to be encoded matches one another. When the divided images 22 through 28 are input to each of the encoders 31 through 37 and encoded, the vertical synchronizing signals input to the encoders 31 through 37 are synchronized. Therefore, the advance of the system time clock (STC) of each of the encoders 31 through 37 is matched. However, since the initial value of the STC is different, the STC values are different, the values of the PTS added to the pictures based on the divided images 22 through 28 of the same original image 20 encoded by each of the encoders 31 through 37 are also different. Accordingly, in the present embodiment, one of the encoders 31 through 37 is made to function as a master encoder, and the other three encoders are made to function as slave encoders, thereby preventing avoiding different PTS values. The details are described later.

The decoding apparatus 5 according to the present embodiment includes four decoders 51 through 57, a distributor 59, and a HUB 61. As illustrated in FIGS. 1 and 2, the decoding apparatus 5 decodes the information which is encoded by the encoding apparatus 3 and transmitted through the IP network 7, and plays back a playback image 40 by displaying divided images 42 through 48. The distributor 59 distributes the clock (generator lock (GEN-LOCK)) obtained from the decoder 51 to the decoders 53 through 57. The HUB 61 collects a plurality of cables and transmits information. The display device 11 combines the divided images 42 through 48 decoded by the decoding apparatus 5 and displays.

One of the decoders 51 through 57 functions as a master decoder, and the other three decoders function as slave decoders. The master decoder decodes an encoded image, and notifies the slave decoders of the timing of playing back the image. There are no restrictions on the encoded picture output by which of the encoders 31 through 37, or on which decoders 51 through 57 are to decode the encoded picture. There are also no restrictions on the master decoder in the decoders 51 through 57.

In the following description, assume that the encoder 31 is a master encoder, but there is no restriction on which of the divided images 22 through 28 is to be used as the master decoder. When the encoder 31 is determined as one master encoder, the encoder 31 notifies the encoders 33 through 37 of the STC value as the timing of the next vertical synchronizing signal through a LAN (local area network) 121. The encoders 33 through 37 change the STC value of the next vertical synchronizing signal to the STC value notified from the encoder 31. In this case, the encoder 31 may individually notify the encoders 33 through 37 by unicast, and receive a reply from the encoders 33 through 37. The encoder 31 may collectively notify the three encoders 33 through 37 by broadcast or multicast of the STC value. Thus, the STC synchronization of the encoders 31 through 37 is performed, and the PTS value of each encoded picture which is generated from the STC value of each vertical synchronizing signal is matched.

The configuration of the hardware of the encoders 31 through 37 is described below with reference to FIGS. 3 through 5. FIG. 3 illustrates a configuration of the hardware of the encoders 31 through 37. The encoders 31 through 37 include a reception device 70, a PLL (phase locked loop) 72, an encoding unit 74, memory 82, a CPU (central processing unit) 84, and a LAN control unit 86.

The encoding unit 74 includes a video unit 76, a voice unit 78, and a multiplexing device 80. The reception device 70 receives a video signal 100 in, for example, a high definition-serial digital interface (HD-SDI) system which is output from the camera 9. The encoding unit 74 encodes the received video signal. In this case, the video unit 76 encodes the video information in the video signal, and the voice unit 78 encodes the voice information. The multiplexing device 80 multiplexes the encoded image and the encoded voice, and generates a stream. The memory 82 temporarily holds the generated stream. The CPU 84 outputs the stream, which is output from the encoding unit 74 and passes through the memory 82, to the LAN 121 through the LAN control unit 86. The PLL 72 generates an operation clock of the encoding unit 74 from the video signal input to the encoders 31 through 37.

Figure 4:
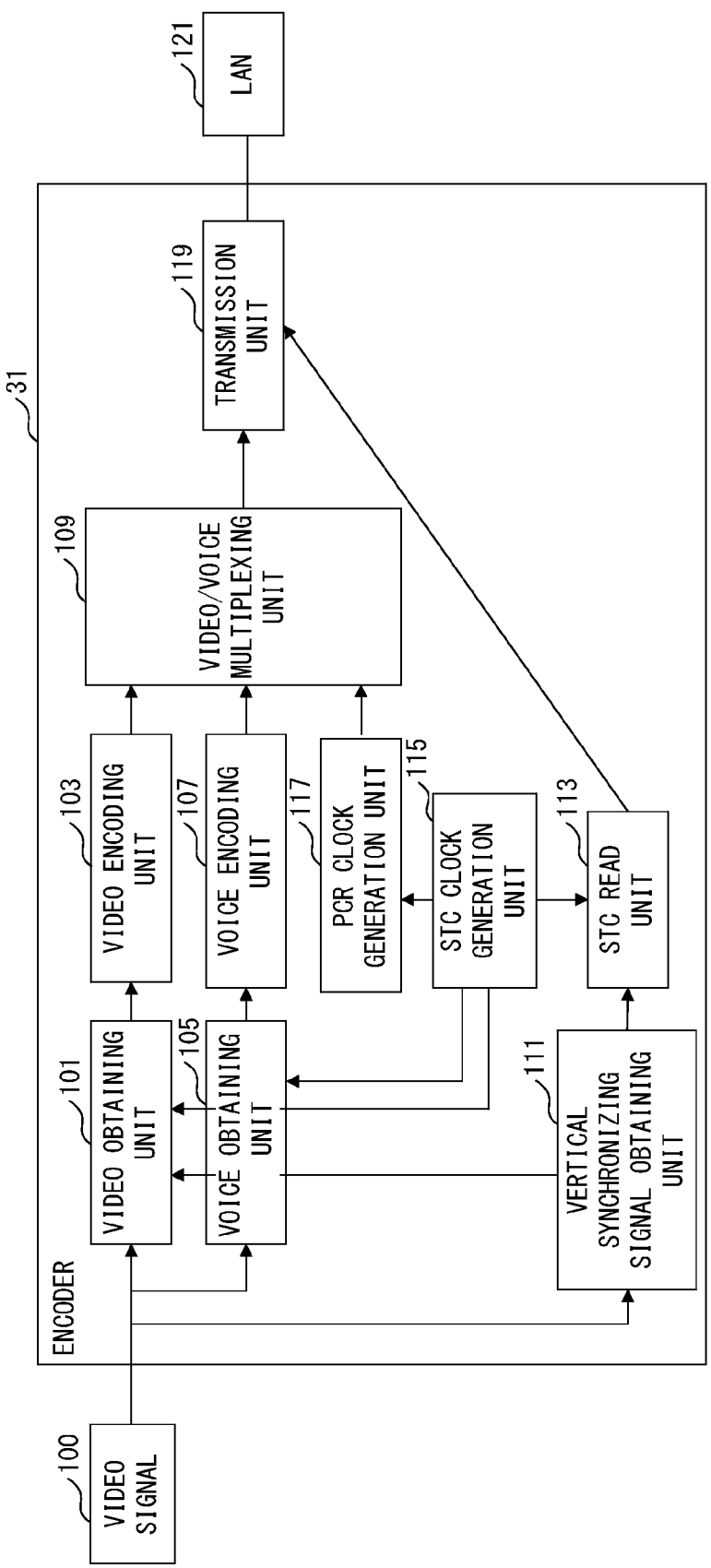
FIG. 4 is a block diagram of the function of the encoder according to an embodiment of the present invention.

FIG. 4 is a block diagram of the function of the encoder 31. The encoder 31 as a master encoder which having the hardware configuration illustrated in FIG. 3 includes a video obtaining unit 101, a video encoding unit 103, a voice obtaining unit 105, a voice encoding unit 107, and a video/voice multiplexing unit 109 as illustrated in FIG. 4. Further, as illustrated in FIG. 4, the encoder 31 includes a vertical synchronizing signal obtaining unit 111, an STC read unit 113, an STC clock generation unit 115, a PCR clock generation unit 117, and a transmission unit 119.

The video obtaining unit 101 obtains, for example, the video part (video information) in the video signal in the HD-SDI system. The video encoding unit 103 encodes the video information obtained by the video obtaining unit 101. In this case, the video encoding unit 103 encodes the video information in accordance with, for example, the MPEG 2, and generates an encoded picture.

The voice obtaining unit 105 obtains, for example, the voice part (voice information) in the video signal in the HD-SDI system. The voice encoding unit 107 generates encoded voice by encoding the voice information obtained by the voice obtaining unit 105. In this case, the voice encoding unit 107 encodes the voice information in accordance with standard, for example, such as the AAC, the HE-AA, or the like.

The STC clock generation unit 115 generates a clock synchronized with the vertical synchronizing signal of the video signal 100 as a reference clock in the encoder 31, and outputs the clock to the video obtaining unit 101, the voice obtaining unit 105, the STC read unit 113, and the PCR clock generation unit 117. The STC is a reference clock for encoding and playback in each encoding apparatus and decoding apparatus by the video coding by the H. 264 and MPEG 2 systems. The vertical synchronizing signal obtaining unit 111 obtains a vertical synchronizing signal (Vsync) from the video signal of the camera 9, outputs the signal to the video obtaining unit 101 and the STC read unit 113, and measures the period of the vertical synchronizing signal.

The video obtaining unit 101 obtains the video information for each vertical synchronizing signal. In this case, the video obtaining unit 101 obtains the divided image 22 for each vertical synchronizing signal described later, holds as a PTS value, wherein the STC value obtained when the divided image 22 is obtained, and the video encoding unit 103 encodes the video information into picture data. Furthermore, the video encoding unit 103 generates an encoded picture by adding to each piece of picture data the held PTS value as the value indicating the playback time in the decoding apparatus 5. The voice obtaining unit 105 obtains the voice information from the camera 9.

The PCR clock generation unit 117 generates the PCR by adding the encoding process delay time to the STC value . The video/voice multiplexing unit 109 multiplexes the encoded image and voice, and the generated PCR, and generates the TS stream including an encoded picture in the time series. The transmission unit 119 transmits the generated TS stream to the IP network 7 through the LAN 121 and the HUB 39.

The STC read unit 113 reads the STC value at the time when the vertical synchronizing signal obtaining unit 111 obtains a vertical synchronizing signal. The STC read unit 113 calculates the STC value of the next vertical synchronizing signal by adding the period of the vertical synchronizing signal measured by the vertical synchronizing signal obtaining unit 111 to the obtained STC value. The STC read unit 113 notifies the encoders 33 through 37 of the calculated STC value through the transmission unit 119 and the LAN 121 by unicast, broadcast, or multicast.

Figure 5:
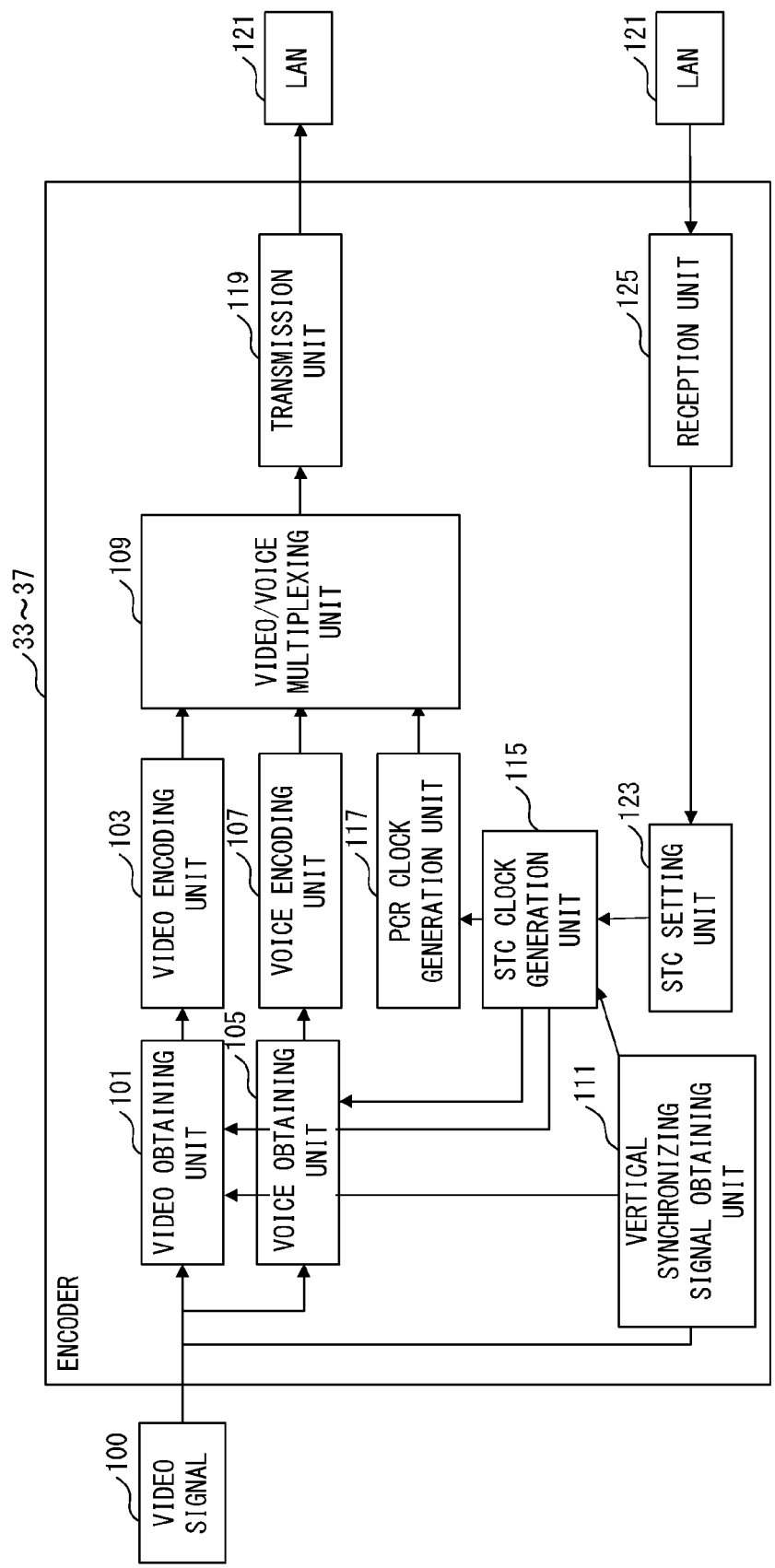
FIG. 5 is a block diagram of the function of the encoder according to an embodiment of the present invention.

FIG. 5 is a block diagram of the function of the encoders 33 through 37. The encoders 33 through 37 are illustrated in the same function block diagram. In FIG. 5, the same configuration as the encoder 31 is assigned the same reference numeral, and the detailed explanation is omitted. As illustrated in FIG. 5, as with the decoder 51, the encoders 33 through 37 have the functions of the video obtaining unit 101, the video encoding unit 103, the voice obtaining unit 105, the voice encoding unit 107, and the video/voice multiplexing unit 109. The encoders 33 through 37 also have the functions of the vertical synchronizing signal obtaining unit 111, the STC clock generation unit 115, the PCR clock generation unit 117, and the transmission unit 119 as with the decoder 51. Furthermore, the encoders 33 through 37 have the functions of an STC setting unit 123 and a reception unit 125.

The reception unit 125 receives the STC value of the next vertical synchronizing signal which is notified from the encoder 31 through, for example, the LAN 121. The STC setting unit 123 obtains the STC value of the next vertical synchronizing signal through the reception unit 125, and sets the value in the STC clock generation unit 115 as the STC value of the next vertical synchronizing signal.

The video obtaining unit 101 obtains the divided images 24 through 28 from the camera 9 for each vertical synchronizing signal, and stores the obtained STC value as the PTS value. As described above, since the STC generated by the STC clock generation unit 115 reflects the STC value notified from the encoder 31, the stored PTS value is equal to the PTS value in the encoder 31. The operations of the video encoding unit 103, the voice obtaining unit 105, the voice encoding unit 107, the video/voice multiplexing unit 109, or the like are similar to the operation of the encoder 31, and output the TS stream as with the encoder 31.

By configuring the encoders 31 through 37 as described above, the stream generated based on the original image 20 which is transmitted over the IP network 7 may be four different streams after encoding the divided images 22 through 28. However, the PTS value included in each encoded picture is the value specified by the encoder 31, and the STC synchronization of the PTS is performed.

Figure 7:
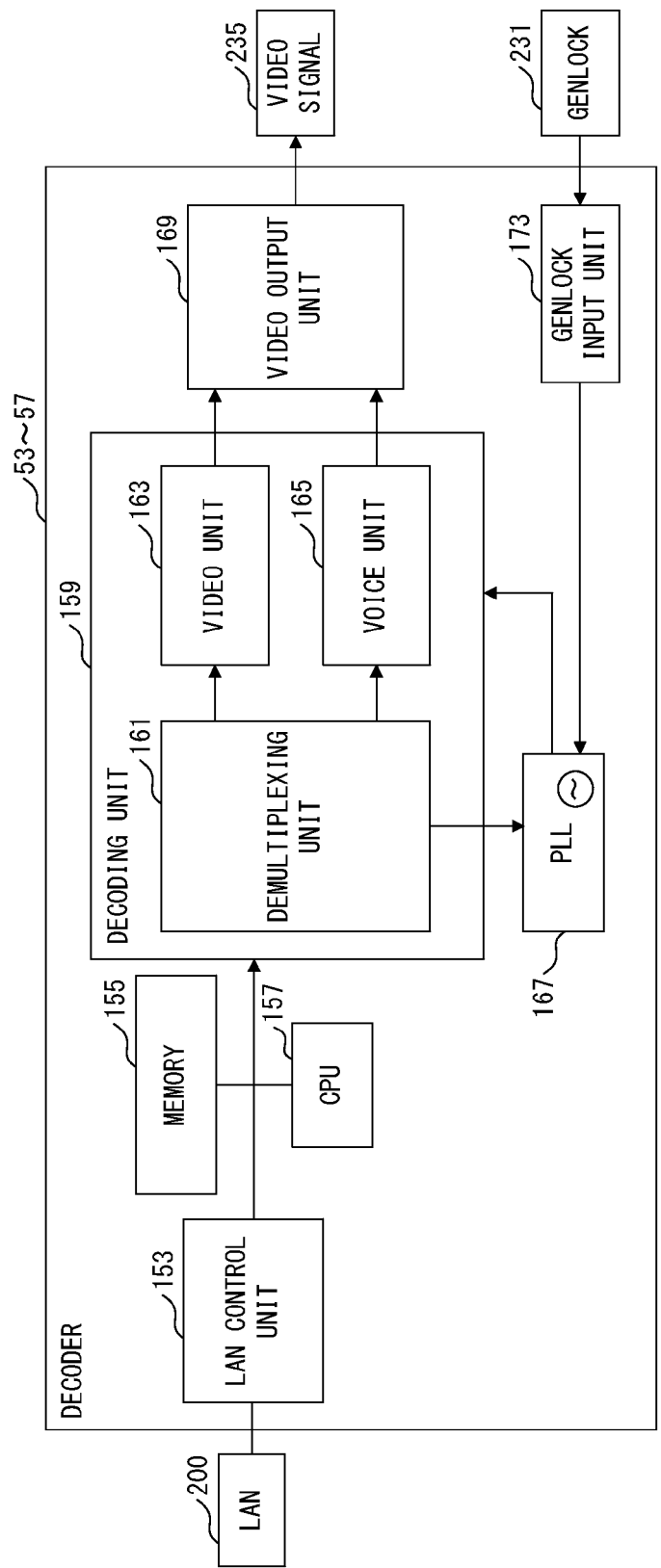
FIG. 7 is a block diagram of the configuration of the hardware of the decoder according to an embodiment of the present invention.

Described next is the decoder according to the present embodiment. FIG. 6 is a block diagram of the configuration of the hardware of the decoder 51 according to the present embodiment. FIG. 7 is a block diagram of the configuration of the hardware of the decoders 53 through 57 according to the present embodiment. In the present embodiment, the decoder 51 is determined as a master decoder in the decoders 51 through 57, and the configuration is designed to synchronize the timing of playing back the images in the decoders 51 through 57.

As illustrated in FIG. 6, the decoder 51 includes a LAN control unit 153, a memory 155, a CPU 157, a decoding unit 159, a PLL 167, a video output unit 169, and a GENLOCK output unit 173. The decoding unit 159 includes a demultiplexing unit 161, a video unit 163, and a voice unit 165.

The LAN control unit 153 controls the communication by the LAN 200 with the decoders 53 through 57, the distributor 59, or the like. The memory 155 holds the encoded image stream etc. which has been received through the LAN 200. The CPU 157 is a processor which controls the transfer etc. of data from the memory 155.

The decoding unit 159 decodes a stream of encoded images which is obtained through the LAN 200. In this case, the demultiplexing unit 161 demultiplexes the video part, the voice part, and the PCR from the received stream. The video unit 163 decodes the information of the video part. The voice unit 165 decodes the information of the voice part.

The PLL 167 generates an operation clock of the decoding unit 159 based on the PCR demultiplexed by the demultiplexing unit 161. The video output unit 169 outputs the decoded information of the image and voice. The GENLOCK output unit 173 generates a GENLOCK signal 231 according to the PLL 167 and outputs the GENLOCK signal 231 to the distributor 59.

The decoder 51 obtains the encoded stream of images through the LAN control unit 153, and the CPU 157 inputs the obtained stream to the decoding unit 159 through the memory 155. In the decoding unit 159, the demultiplexing unit 161 demultiplexes the input stream into a video part and a voice part, and outputs them respectively to the video unit 163 and the voice unit 165. The demultiplexing unit 161 demultiplexes the PCR from the input stream. The PLL 167 generates an operation clock of the decoding unit 159 based on the PCR. A video signal 235 in, for example, the HD-SDI system which has been decoded by the video unit 163 and the voice unit 165 is output from the video output unit 169. Furthermore, the decoder 51 outputs the GENLOCK signal 231 to the distributor 59 by the GENLOCK output unit 173.

As illustrated in FIG. 7, in the decoders 53 through 57, the same configuration as the decoder 51 is assigned the same reference numeral, and the detailed explanation is omitted. As with the decoder 51, the decoders 53 through 57 include the LAN control unit 153, the memory 155, the CPU 157, the decoding unit 159, the PLL 167, and the video output unit 169. The decoding unit 159 includes the demultiplexing unit 161, the video unit 163, and the voice unit 165. The decoders 53 through 57 include a GENLOCK input unit 171 instead of the GENLOCK output unit 173 of the decoder 51.

In the decoders 53 through 57, the GENLOCK input unit 171 obtains the GENLOCK signal 231 from the distributor 59, and the PLL 167 generates a clock according to the GENLOCK signal 231. Other configurations are similar to the configuration of the decoder 51.

Figure 8:
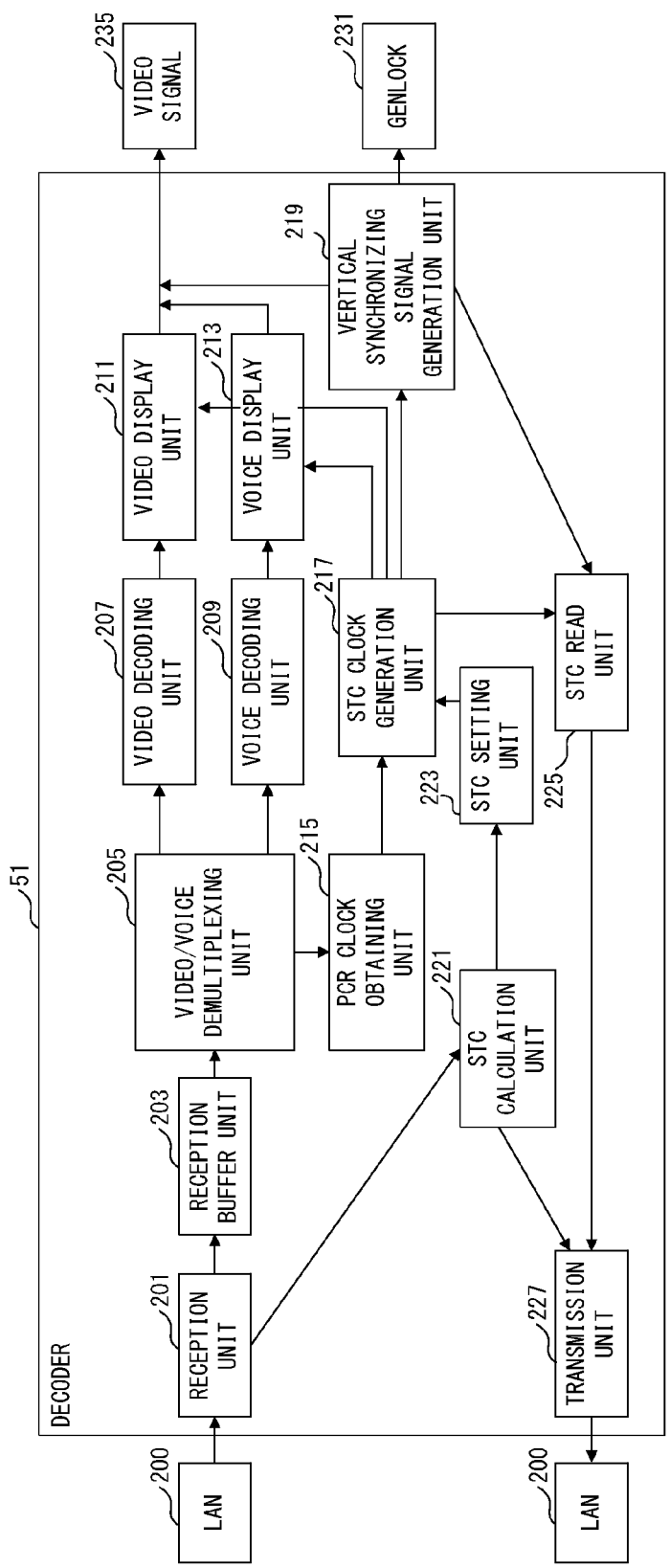
FIG. 8 is a block diagram of the function of the decoder according to an embodiment of the present invention.
Figure 9:
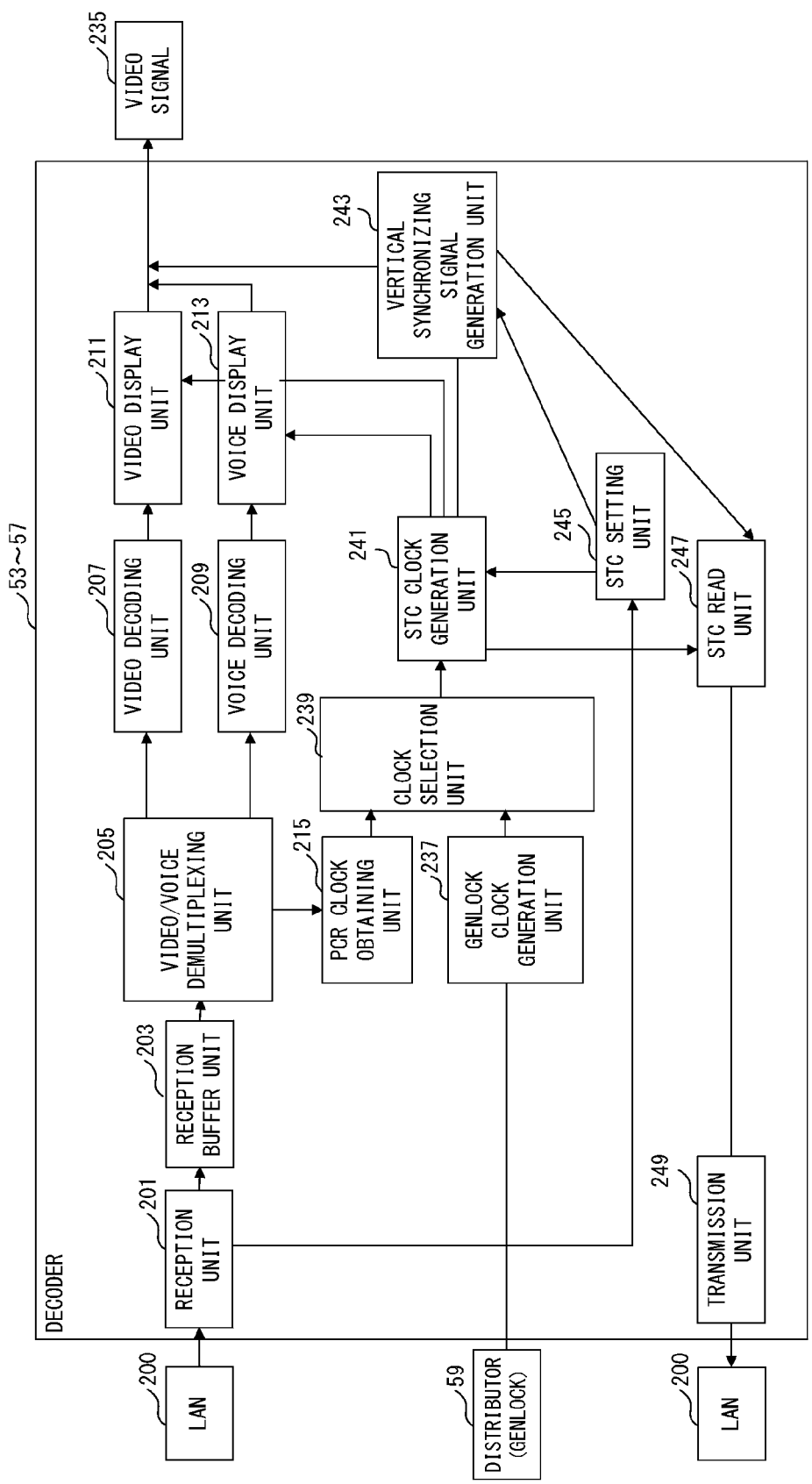
FIG. 9 is a block diagram of the function of the decoder according to an embodiment of the present invention.

The functions of the decoders 51 through 57 according to the present embodiment are described below with reference to FIGS. 8 and 9. FIG. 8 is a block diagram of the function of the decoder 51. FIG. 9 is a block diagram of the function of the decoders 53 through 57. As described above, in the present embodiment, since the TS streams of the four encoders 31 through 37 are transmitted as separate TS streams, each TS stream reaches the decoder at different time. Therefore, when the decoding apparatus 5 simply plays back the received TS streams using the decoders 51 through 57 without synchronization, a different image is played back for each divided screen.

The function of the decoder 51 is described below with reference to FIG. 8. As illustrated in FIG. 8, the decoder 51 includes a reception unit 201, a reception buffer unit 203, a video/voice demultiplexing unit 205, a video decoding unit 207, a voice decoding unit 209, a video display unit 211, and a voice display unit 213. The decoder 51 also includes a PCR clock obtaining unit 215, an STC clock generation unit 217, a vertical synchronizing signal generation unit 219, an STC calculation unit 221, an STC setting unit 223, an STC read unit 225, and a transmission unit 227.

The reception unit 201 receives, for example, a TS stream which is obtained by dividing the original image 20 and encoded, and transmitted over the IP network 7. The reception buffer unit 203 smoothes the fluctuation of the IP network 7 by temporarily storing the received information. The video/voice demultiplexing unit 205 demultiplexes the video part, the voice part, and the PCR from the received TS stream. The video/voice demultiplexing unit 205 outputs the demultiplexed PCR to the PCR clock obtaining unit 215, and outputs the demultiplexed encoded picture and voice to the video decoding unit 207 and the voice decoding unit 209 respectively.

The PCR clock obtaining unit 215 obtains the demultiplexed PCR, and outputs it to the STC clock generation unit 217. The STC clock generation unit 217 generates an STC clock based on the obtained PCR.

The reception unit 201 obtains the STC value of the next vertical synchronizing signal from each of the decoders 53 through 57, and outputs the value to the STC calculation unit 221. The STC calculation unit 221 calculates the latest STC value based on the STC value from the decoders 53 through 57 and the STC value of the next vertical synchronizing signal of the STC calculation unit 221, outputs the result to the STC setting unit 223, and notifies the decoders 53 through 57 of the result through the transmission unit 227.

The STC setting unit 223 notifies the STC clock generation unit 217 of the calculated STC value. The STC clock generation unit 217 sets a specified set value as the STC value of the next vertical synchronizing signal, thereby generating the STC clock which is synchronized with the set STC value, and outputs the STC clock to the video display unit 211, the voice display unit 213, and the vertical synchronizing signal generation unit 219. The vertical synchronizing signal generation unit 219 generates a vertical synchronizing signal using the generated STC clock, outputs the signal as the GENLOCK signal 231 to the distributor 59, and outputs the generated vertical synchronizing signal according to the GENLOCK signal 231. The GENLOCK signal 231 is a signal for synchronization of the decoders 51 through 57.

The STC read unit 225 obtains a vertical synchronizing signal from the vertical synchronizing signal generation unit 219, obtains the STC value of the next vertical synchronizing signal by referring to the clock generated by the STC clock generation unit 217, and notifies the transmission unit 227 of the value.

The video decoding unit 207 decodes an image and outputs the result to the video display unit 211. The voice decoding unit 209 decodes voice and outputs the result to the voice display unit 213. The video display unit 211 outputs the decoded video information based on the STC and the PTS, and the voice display unit 213 outputs the decoded voice information. The video information and the voice information are output as the video signal 235 according to the vertical synchronizing signal output by the vertical synchronizing signal generation unit 219, the display device 11 display a divided image 42.

The functions of the decoders 53 through 57 are described below with reference to FIG. 9. The same configuration as the decoder 51 is assigned the same reference numeral, and the detailed explanation is omitted. As illustrated in FIG. 9, the decoders 53 through 57 include the reception unit 201, the reception buffer unit 203, the video/voice demultiplexing unit 205, the video decoding unit 207, the voice decoding unit 209, the video display unit 211, and the voice display unit 213 as with the decoder 51. The decoders 53 through 57 include the PCR clock obtaining unit 215, the GENLOCK clock generation unit 237, the clock selection unit 239, the STC clock generation unit 241, the vertical synchronizing signal generation unit 243, the STC setting unit 245, the STC read unit 247, and the transmission unit 249.

The PCR clock obtaining unit 215 obtains the PCR demultiplexed by the video/voice demultiplexing unit 205 as with the decoder 51 when the reception of a TS stream is started. The clock selection unit 239 switches the reference clock of the STC clock by switching the connection between the STC clock generation unit 241 and the PCR clock obtaining unit 215 or the GENLOCK clock generation unit 237. The clock selection unit 239 connects the PCR clock obtaining unit 215 to the STC clock generation unit 241 to generate an STC clock from the PCR clock obtained by the PCR clock obtaining unit 215 as with the decoder 51 when the reception of the TS stream is started. Upon notification of the STC value of the next vertical synchronizing signal from the decoder 51, the clock selection unit 239 connects the GENLOCK clock generation unit 237 to the STC clock generation unit 241. The GENLOCK clock generation unit 237 obtains the GENLOCK signal 231 from the distributor 59.

The STC clock generation unit 241 generates an STC clock based on the clock input through a clock selection unit 239. When the PCR clock obtaining unit 215 is connected to the STC clock generation unit 241, a vertical synchronizing signal generation unit 243 generates a vertical synchronizing signal using the STC clock as with the decoder 51. When a GENLOCK clock generation unit 237 is connected to the STC clock generation unit 241, the vertical synchronizing signal generation unit 243 generates a vertical synchronizing signal by the GENLOCK signal 231. According to the generated vertical synchronizing signal, the video information and the voice information are output to the display device 11.

After the generation of the STC clock is started by the STC clock generation unit 241, an STC read unit 247 reads each STC value with the timing of the next vertical synchronizing signal, and notifies the decoder 51 of the value through the transmission unit 249 and the LAN 200.

The reception unit 201 receives the STC value of the next vertical synchronizing signal from the decoder 51, and notifies an STC setting unit 245 of the value. By notifying the STC clock generation unit 241 of the received STC value, the STC setting unit 245 sets the STC value notified from the decoder 51 as the STC value of the STC setting unit 245. Based on the set STC value and the vertical synchronizing signal, the decoders 53 through 57 output the video signal 235 and the display device 11 displays the divided images 44 through 48.

Next, the concept of the stream generated by the encoding apparatus 3 above is described below with reference to FIGS. 10 and 11. FIG. 10 illustrates the concept of the streams 300, 310, 320, and 330 (hereafter referred to collectively as TS streams 300 through 330). As illustrated in FIG. 10, the encoders 31 through 33 encode a video signal of the divided image obtained from the camera 9, and generate the TS streams 300 through 330. For example, the TS stream 300 includes an encoded picture 302, an encoded picture 306, etc. For example, a TS stream 310 includes an encoded picture 312, an encoded picture 316, or the like.

In this case, for example, the encoded picture 302 is a picture by encoding the divided images 22 and 24 from the same original image 20 as the encoded picture 312. However, added PTS 303 and PTS 313 are different, that is, PTS (1, 1) and PTS (2, 1) respectively.

Figure 11:
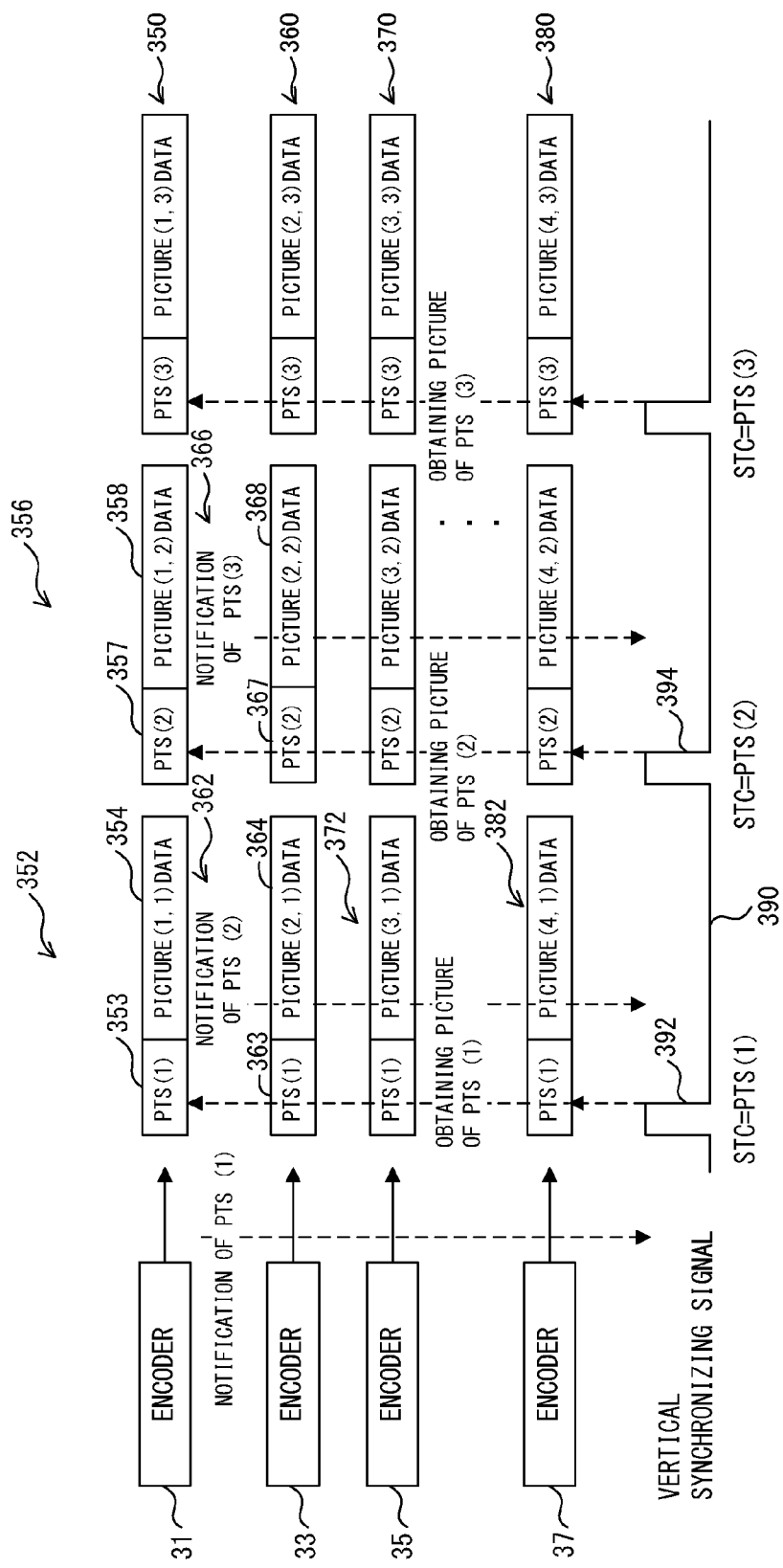
FIG. 11 illustrates the concept of the TS stream when the STC synchronization of the PTS according to an embodiment of the present invention is performed.

FIG. 11 illustrates a concept of an example of the TS streams 350 through 380 when the STC synchronization is performed on the PTS according to an embodiment. For example, the encoders 31 through 37 output the TS streams 350 through 380. As described above, the encoder 31 notifies the encoders 33 through 37 of the PTS (1) as the STC value which indicates the time of the next vertical synchronizing signal. In this case, the encoders 31 through 37 set the falling time 392 of a vertical synchronizing signal 390 as the same STC, that is, the PTS (1). Therefore, the PTS 353, 363, or the like added to each of the encoded pictures 352, 362, 372, and 382 which are encoded by obtaining the divided images 22 through 28 of the same original image 20 are assigned the same PTS=PTS (1).

Similarly, the PTS 357 or the like added to the encoded pictures 356, 366, or the like are assigned the same value, that is, PTS (2). As described above, the same PTS is added to the TS stream based on the divided images 22 through 28 of the same original image 20. Thus, the synchronization of the STC of the encoders 31 through 37 may be performed, and the PTS value of each encoded picture which is generated from the STC value of each vertical synchronizing signal may match each other.

Figure 12:
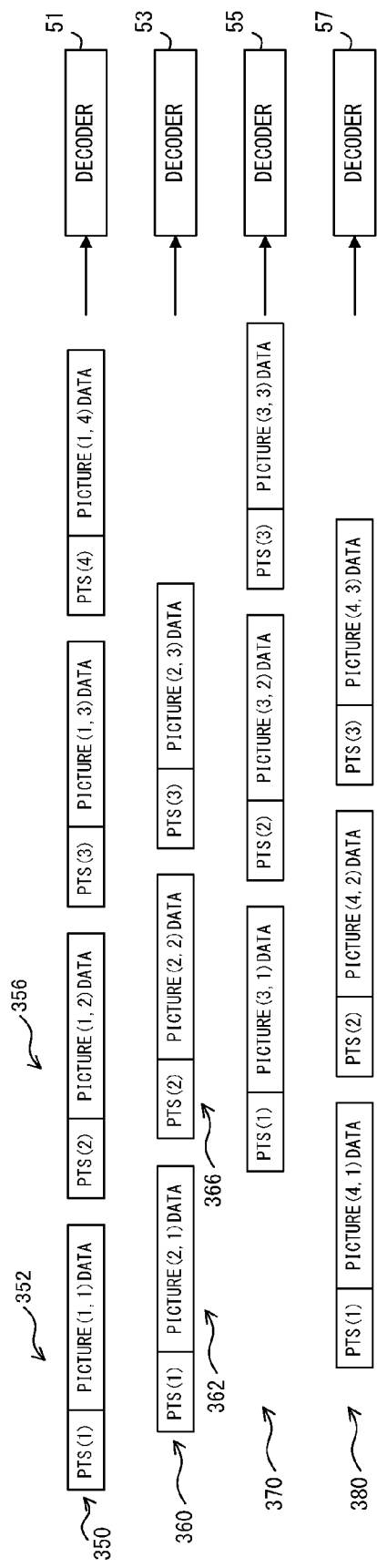
FIG. 12 illustrates the concept of an example of the state of the TS stream after the communication in the IP network when the STC synchronization is performed according to an embodiment of the present invention.

FIG. 12 illustrates a concept of an example of the state of the TS streams 350 through 380 after the communication in the IP network 7 when the STC synchronization is performed on the PTS in the encoding apparatus 3. As illustrated in FIG. 12, when the TS streams 350 through 380 are transmitted over the IP network 7, the arrival time at the decoders 51 through 57 is different because the transmission delay time is not constant. However, as described above, since the same PTS is added to the divided images 22 through 28 of the same original image 20, the decoders 51 through 57 may identify the TS streams of the same original image 20.

Figure 13:
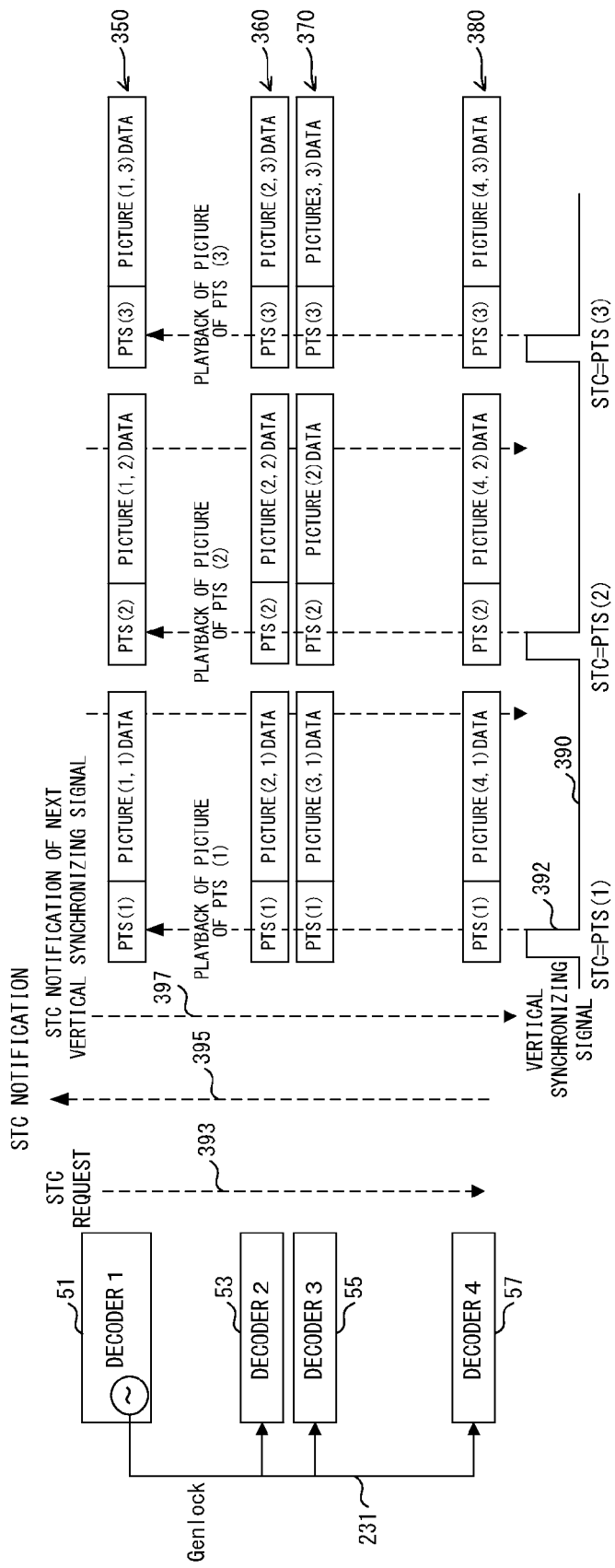
FIG. 13 illustrates the concept of an example of the state of the TS stream 350 through 380 after the communication in the IP network when the STC synchronization is performed according to an embodiment of the present invention.

FIG. 13 illustrates the concept of an example when the TS streams 350 through 380 are decoded by the decoders 51 through 57 when the STC synchronization is performed on the PTS. As illustrated in FIG. 13, the decoder 51 supplies the GENLOCK signal 231 to the decoders 53 through 57 through the distributor 59. Furthermore, when the decoder 51 requests the decoders 53 through 57 for the STC value of the next vertical synchronizing signal as with an STC request 393, the decoders 53 through 57 notify the decoder 51 of each STC value as with an STC notification 395. The decoder 51 transmits a notification such as a notification 397 about the time of the next vertical synchronizing signal based on the latest value between the notified STC value and the STC value of the next vertical synchronizing signal of the decoder, and sets the value in the decoders 51 through 57. Accordingly, in the decoders 51 through 57, the TS stream of the same original image 20 is synchronized and output to the display device 11.

The operations of the encoding apparatus 3 and the decoding apparatus 5 are explained below with reference to the flowchart. First, with reference to FIGS. 14 and 15, the operation of the encoding apparatus 3 according to the present embodiment is described below. FIG. 14 is a flowchart of the operation of the encoder 31. FIG. 15 is a flowchart of the operations of the encoders 33 through 37.

As illustrated in FIG. 14, the encoder 31 first detects the timing of a vertical synchronizing signal for the video signal obtained from the camera 9, and obtains the STC value upon detection (S401). The encoder 31 calculates the STC value of the next vertical synchronizing signal based on the obtained STC value, notifies the encoders 33 through 37 of the value (S402), outputs, for example, the TS stream 350, and repeats the process back in step S401.

As illustrated in FIG. 15, upon receipt of the STC value of the next vertical synchronizing signal from the encoder 31 (S411), the encoders 33 through 37 detect the timing of the vertical synchronizing signal (S412). The STC setting unit 245 sets the received value as the STC value of the next vertical synchronizing signal (S413), outputs, for example, the TS streams 350 through 380, and repeats the process back in S411.

Figure 16A:
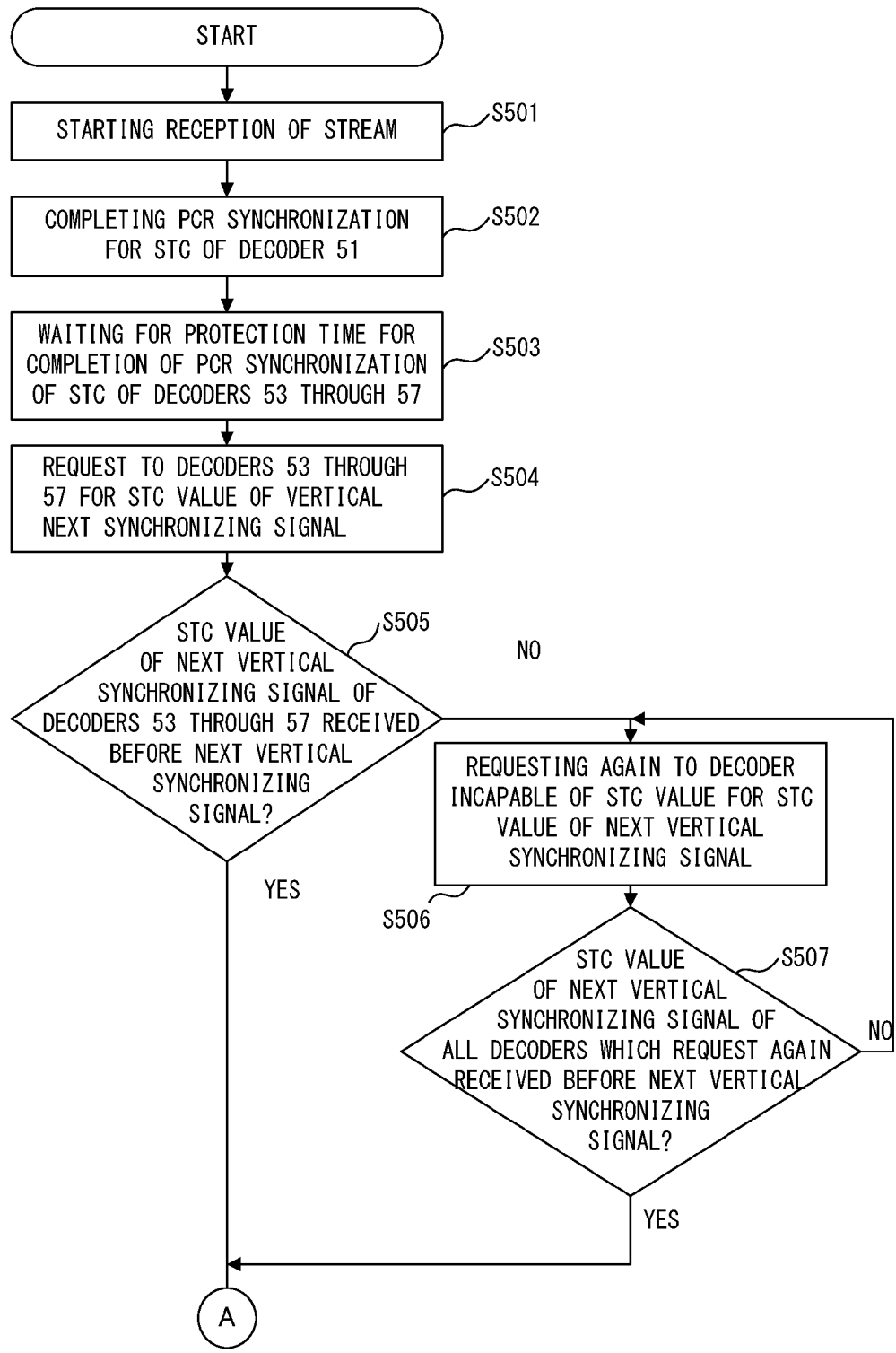
FIGS. 16A and 16B are a flowchart of the operation of starting the playback of the decoder according to an embodiment of the present invention.
Figure 16B:
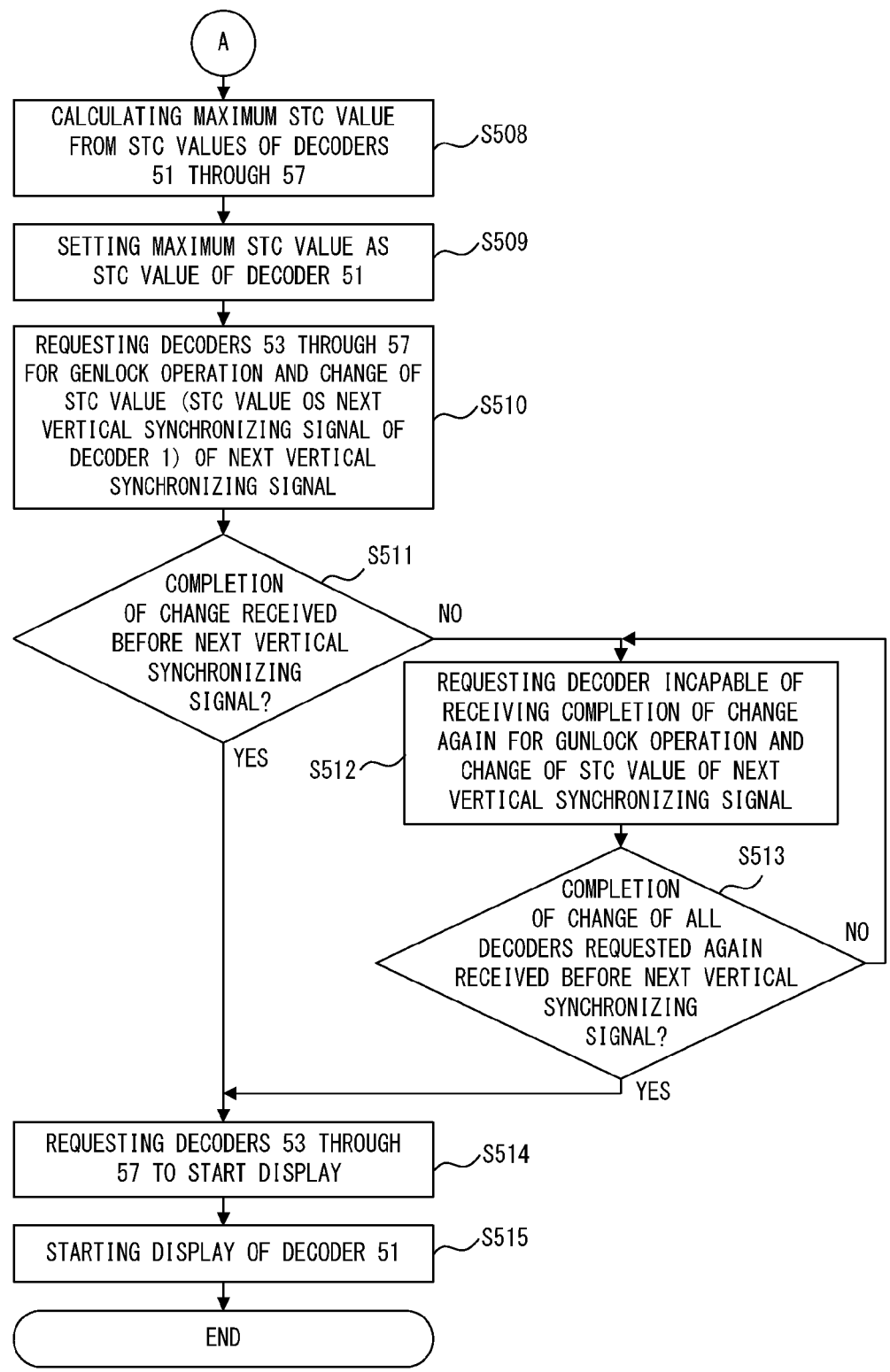
Figure 17:
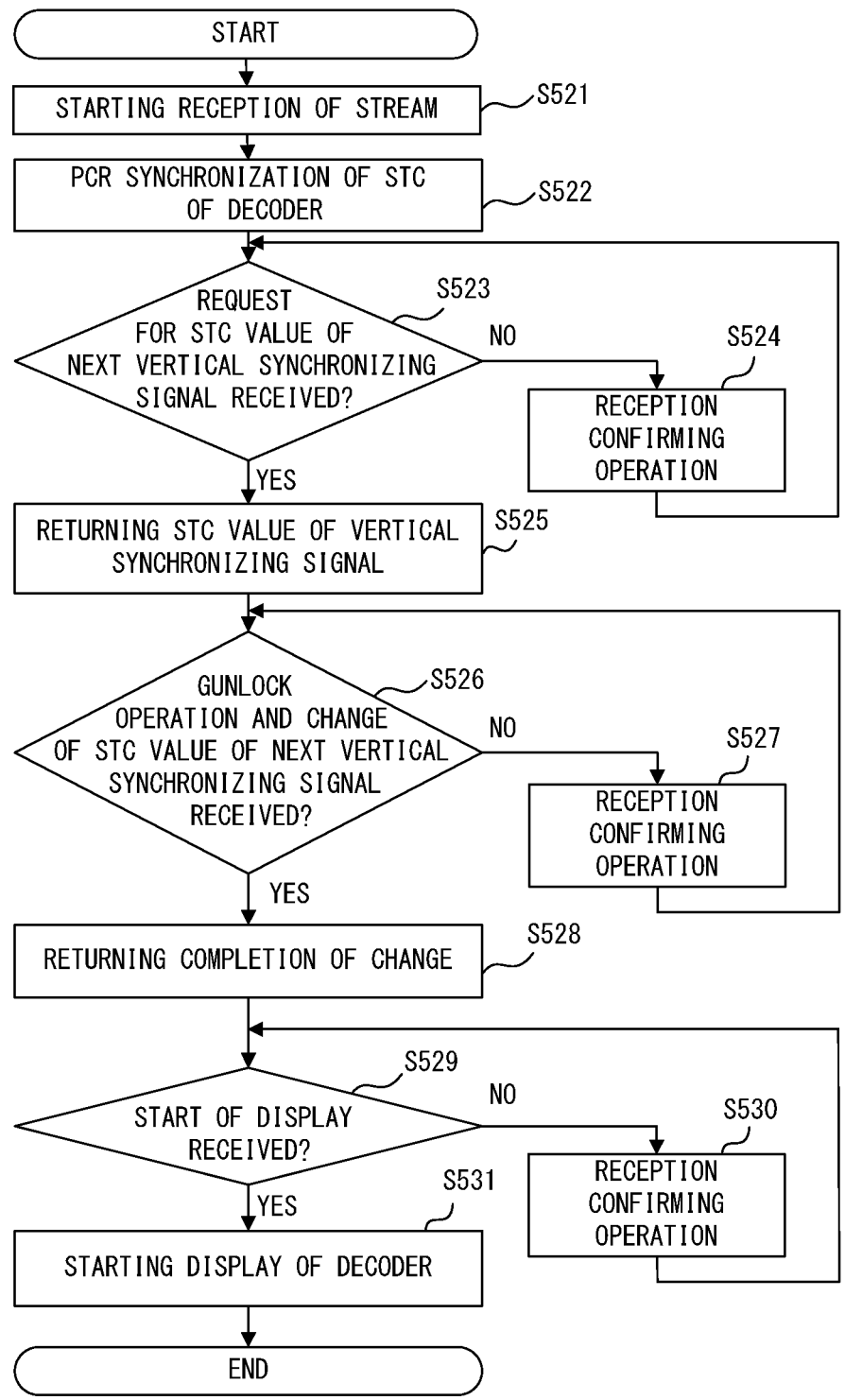
FIG. 17 is a flowchart of the operation of starting the playback of the decoder according to an embodiment of the present invention.

Described next is the playback starting operation of the decoders 51 through 57. FIGS. 16A and 16B are flowcharts of the playback starting operation of the decoder 51. FIG. 17 is a flowchart of the playback starting operation of the decoders 53 through 57.

As illustrated in FIG. 16A, the reception unit 201 of the decoder 51 starts receiving, for example, the TS stream 350 (S501). The demultiplexing unit 205 demultiplexes the image, the voice, and the PCR from the TS stream 350 temporarily stored by the reception buffer unit 203. The PCR clock obtaining unit 215 obtains the PCR from the video/voice demultiplexing unit 205, and outputs it to the STC clock generation unit 217. When the STC clock generation unit 217 generates an STC clock synchronized with the PCR, the PCR synchronization for the STC of the decoder 51 is completed (S502). The decoder 51 waits protection time for the completion of the transmission of the STC clock synchronized with the PCR as with the decoders 53 through 57 (S503).

The decoder 51 requests the decoders 53 through 57 through the transmission unit 227 for the STC value of the next vertical synchronizing signal (S504). The decoder 51 determines whether the STC value of the next vertical synchronizing signal of the decoders 53 through 57 is received before the next vertical synchronizing signal is obtained (S505). Unless the STC value is received (NO in S505), the decoder 51 requests again the decoders 53 through 57 which are not received the STC value for the STC value of the next vertical synchronizing signal. (S506). The decoder 51 determines whether the reception unit 201 is received the STC value of the next vertical synchronizing signal from the decoders 53 through 57 which are requested again before the next vertical synchronizing signal is obtained (S507).

Unless the STC value which is requested again is received (NO in S507), the decoder 51 repeats the process back in S506. When the STC value which has been requested again is received (YES in S507), the decoder 51 calculates using the STC calculation unit 221 the maximum value from among the STC values of the received decoders 53 through 57 and the STC value of the next vertical synchronizing signal of the decoder 51 (S508).

As illustrated in FIG. 16B, the decoder 51 sets the calculated maximum STC value as the STC value of the next vertical synchronizing signal through the STC setting unit 223 (S509). The decoder 51 sets the calculated maximum STC value as the STC value of the next vertical synchronizing signal in the decoders 53 through 57 through the transmission unit 227. Furthermore, the decoder 51 requests the clock selection unit 239 to connect the STC clock generation unit 241 to the GENLOCK clock generation unit 237 (S510). Thus, the decoders 53 through 57 perform the operations based on the GENLOCK signal 231, and may synchronize the vertical synchronizing signals of the decoders 51 through 57 and the STC clock.

The decoder 51 determines whether the setting the STC value is completed in the decoders 53 through 57 before the time of the STC value of the next vertical synchronizing signal (S511). If not (NO in S511), the decoder 51 requests through the transmission unit 227 the decoders 53 through 57 which are not completed the setting to set the STC value of the next vertical synchronizing signal and allow the clock selection unit 239 to connect the STC clock generation unit 241 to the GENLOCK clock generation unit 237 (S512). The decoder 51 determines whether all decoders 53 through 57 set the STC value and completed the switch of the clock selection unit 239 (S513). If not (NO in S513), the request in S512 is repeated. If the switch is completed, the decoder 51 requests the decoders 53 through 57 to start displaying the divided images 44 through 48 (S514). The decoder 51 also outputs the image decoded by the video decoding unit 207 and the voice decoded by the voice decoding unit 209 as the video signal 235 through the video display unit 211 and the voice display unit 213 respectively to start displaying the divided image 42 on the display device 11 (S515).

As illustrated in FIG. 17, the reception unit 201 of the decoders 53 through 57 starts receiving the TS streams 360 through 380 (S521). The video/voice demultiplexing unit 205 demultiplexes the image, the voice and the PCR from the TS streams 360 through 380 temporarily stored by the reception buffer unit 203. The PCR clock obtaining unit 215 obtains the PCR from the video/voice demultiplexing unit 205. In this case, since the clock selection unit 239 connects the PCR clock obtaining unit 215 to the STC clock generation unit 241, the STC clock generation unit 217 generates an STC clock synchronized with the PCR (S522).

The decoders 53 through 57 wait for the decoder 51 requesting the STC value of the next vertical synchronizing signal through the reception unit 201 of the decoders 53 through 57 (S523). When the request for the STC value of the next vertical synchronizing signal is not received (NO in S523), the decoders 53 through 57 confirm again whether the request is received (S524), and repeat the process in step 5523.

When the request for the STC value of the next vertical synchronizing signal is received (YES in S523), the decoders 53 through 57 return to the decoder 51 the STC value of the next vertical synchronizing signal which is read and calculated by the STC read unit 247 (S525).

The decoders 53 through 57 wait for the decoder 51 receiving the STC value of the next vertical synchronizing signal and an instruction of the operation according to the GENLOCK signal 231 through the transmission unit 227 of the decoder 51 and the reception unit 201 of the decoders 53 through 57 (S526). When no instruction is received (NO in S526), the decoders 53 through 57 confirm again the reception (S527), and repeat the process in S526.

Upon receipt of the STC value of the next vertical synchronizing signal and the instruction of the operation based on the GENLOCK signal 231 (YES in S526), the clock selection unit 239 connects the GENLOCK clock generation unit 237 to the STC clock generation unit 241. The STC clock generation unit 241 sets the STC value of the next vertical synchronizing signal notified to the vertical synchronizing signal generation unit 243, and notifies the decoder 51 of the completion of the change through the transmission unit 249 (S528).

The decoders 53 through 57 wait for the reception of the instruction to start displaying the divided images 44 through 48 from the decoder 51 (S529). When no instruction is received (NO in S529), the decoders 53 through 57 confirm again whether the instruction is received (S530), and repeat the process in S529. Upon receipt of the instruction (YES in S529), the decoders 53 through 57 output the video information decoded by the video decoding unit 207 and the voice information decoded by the voice decoding unit 209 as the video signal 235 respectively through the video display unit 211 and the voice display unit 213. Thus, the divided images 44 through 48 are displayed on the display device 11 (S531).

Figure 19:
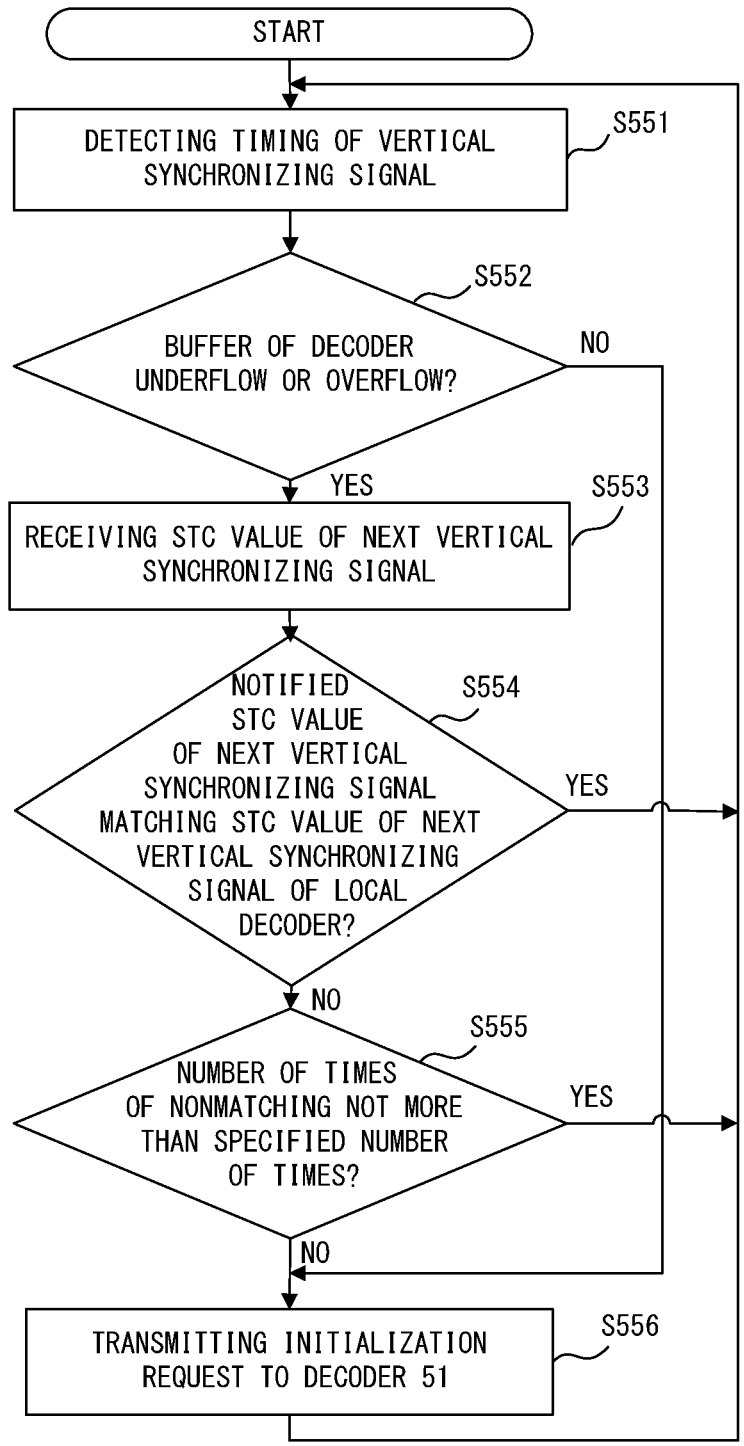
FIG. 19 is a flowchart of the operation of the decoder during the playback according to an embodiment of the present invention.

Then, the operations of the decoders 51 through 57 during the playback are described. FIG. 18 is a flowchart of the operation of the decoder 51 during the playback. FIG. 19 is a flowchart of the operation of the decoders 53 through 57 during the playback.

As illustrated in FIG. 18, the decoder 51 detects through the STC read unit 225 the STC value of the vertical synchronizing signal from the vertical synchronizing signal generation unit 219 (S541), calculates the STC value of the next vertical synchronizing signal, and notifies the decoders 53 through 57 of the value through the transmission unit 227 (S542). The decoder 51 determines whether the initialization request described later is received from the decoders 53 through 57 (S543), and repeats the process from 5541 if the request is not received (NO in S543). If the request is received, the transmission starting process is performed again (YES in S543).

As illustrated in FIG. 19, the decoders 53 through 57 detects the timing of the vertical synchronizing signal from the vertical synchronizing signal generation unit 243 (S551). The decoders 53 through 57 determine whether the reception buffer unit 203 underflows or overflows (S552). Unless it underflows or overflows (NO in S552), the STC value of the next vertical synchronizing signal is received (S553). If it underflows or overflows (YES in S552), control is passed to S556.

Upon receipt of the STC value of the next vertical synchronizing signal, the decoders 53 through 57 determine whether the notified STC value matches the STC value of the next vertical synchronizing signal (S554). If they match each other, control is returned to S551. If not (NO in S554), then the decoders 53 through 57 judges whether or not the number of times of nonmatching is not more than a specified number of times (S555). If it is not more than the specified number of times (YES in S555), control is returned to S551. If the number of times of nonmatching exceeds the specified number of times (NO in S555), then the decoders 53 through 57 transmits the initialization request to the decoder 51 (S556), control is returned to S551, and the process is repeated.

As described above, in the image transmission system 1 according to the embodiment, for example, the encoder 31 functions as a master encoder, in the encoding process of the original image 20, and notifies the encoders 33 through 37 of the STC value corresponding to the next vertical synchronizing signal calculated by the encoder 31. The encoders 33 through 37 set the notified STC value as the STC value of the next vertical synchronizing signal. Thus, the PTS value to be added to the encoded picture encoded by the encoders 31 through 37 indicates the same value for the same original image 20. The TS stream encoded by the encoders 31 through 37 is transmitted through the IP network 7.

In the decoding process, for example, assume that the decoder 51 is a master decoder, the decoder 51 plays back the STC in synchronization with the PCR transmitted from the encoding apparatus 3. The decoder 51, for example, supplies the distributor 59 with a black burst signal (BB signal) of the played back video signal as the GENLOCK signal 231. The distributor 59 distributes the GENLOCK signal 231 to the decoders 53 through 57.

The decoders 53 through 57 plays back the STC in synchronization with the currently received PCR, reads the STC value of the next vertical synchronizing signal, adds the one-period data of the vertical synchronizing signal, and notifies the decoder 51 of the result. The decoder 51 compares the STC value of the next vertical synchronizing signal of the decoder with the STC value of the next vertical synchronizing signal notified from the decoders 53 through 57. The decoder 51 sets the latest STC value as the STC value of the decoder and the STC value of the decoders 53 through 57 so that the last received TS stream may be played back. That is, the decoder 51 notifies the decoders 53 through 57 of the latest value in the STC values obtained by adding the one-period offset to the timing of the vertical synchronizing signal as the set value of the STC corresponding to the time of the next vertical synchronizing signal. The decoders 53 through 57 change the STC value of the next vertical synchronizing signal to the STC value notified from the decoder 51. In this case, the clock selection unit 239 of the decoders 53 through 57 switch the connection of the STC clock generation unit 241 to the GENLOCK clock generation unit 237.

Thus, the decoders 51 through 57 simultaneously display the encoded pictures having the same PTS value, thereby absorbing the delay of each TS stream occurring in the IP network 7, and realizing the playback with the divided images synchronized by the decoding apparatus 5.

As described above, in the transmission over the IP network 7, the encoded picture based on the divided images of the same original image 20 in the encoders 31 through 37 include the same PTS value. Therefore, although there is a difference in arrival time at the decoding apparatus 5, the information about the divided images of the same original image 20 may be identified. Furthermore, although there is a difference in arrival time at the decoding apparatus 5, the decoders 51 through 57 set the STC value corresponding to the next vertical synchronizing signal in synchronization with the next vertical synchronizing signal of the last transmitted encoded picture. Therefore, the STC clock of the decoders 51 through 57 is synchronized with each other. Thus, the divided images 42 through 48 may be played back on the display device 11 stably with the same timing. In this case, providing a further conversion device for the encoding apparatus 3 or the decoding apparatus 5 is not needed, thereby transmitting high definition IP images such as 4K2K, super Hi-Vision, 3D, or the like with a simple equipment with cost reduction.

Furthermore, during the playback of the playback image 40, the decoder 51 notifies the decoders 53 through 57 of the STC value with the timing of the next vertical synchronizing signal. The decoders 53 through 57 also monitor the overflow, underflow, or the like of the buffer by the reception buffer unit 203, and the abnormal condition such as an error that the STC value is exceeded for the specified number of times, and the communication starting process may be performed again when the abnormal condition is detected.

With the above-mentioned encoding apparatus and decoding apparatus, provided are an encoding apparatus, a decoding apparatus, an encoding method, and a decoding method capable of transmitting in real time divided images synchronized in an inexpensive IP network without various conversion devices.

With the embodiments above, the encoder 31 is an example of a master encoder, the encoders 33 through 37 are examples of slave encoders. The video obtaining unit 101 is an example of a divided image acquisition unit, the STC read unit 113 is an example of an identification time notification unit, the video encoding unit 103 is an example of an encoding unit. The STC setting unit 123 is an example of an identification time obtaining unit.

The decoder 51 is an example of a master decoder, and the decoders 53 through 57 are examples of slave decoders. The reception unit 201 is an example of an encoding information obtaining unit, and the STC calculation unit 221 is an example of a master playback time calculation unit and a slave playback time acquisition unit. The STC setting unit 223 is an example of a playback time setting unit, the STC read unit 225 is an example of a playback time notification unit, the video decoding unit 207 is an example of a decoding unit, and the video display unit 211 is an example of a playback unit.

The STC read unit 247 is an example of a slave playback time acquisition unit, the transmission unit 249 is an example of a slave playback time notification unit, and the STC setting unit 245 is an example of a playback time acquisition unit.

Picture data 358 or the like is an example of an encoded divided image, an encoded picture 352 or the like is an example of encoding information, and a PTS value is an example of identified time. The calculation value of the STC of the next vertical synchronizing signal is an example of master playback time and slave playback time, the set value of the STC of the next vertical synchronizing signal is an example of playback time, and the TS streams 350 through 380 are examples of encoding transmission information.

For example, each of the encoders 33 through 37 do not always work immediately although the notified STC value is different from the STC value of the next vertical synchronizing signal of the encoders for protection when the notification of the STC value of the next vertical synchronizing signal which is notified from the encoder 31 is delayed. The number of times of continuous delays exceeding a threshold and the threshold of the delay of the STC value are specified in advance so that the STC setting unit 123 may update the STC value when the threshold is continuously exceeded over the specified number of times or when a delay exceeds the threshold. Thus, a malfunction of reflecting the STC value by the fluctuation of a network may be suppressed. In this case, the PTS value to be added to an encoded picture is not to exceed a threshold.

In the above-mentioned embodiment, the encoding apparatus 3 adds the same PTS value to a stream in all encoders 31 through 37. However, the delay of the STC value of the encoders 33 through 37 with respect to the encoder 31 may be transmitted. Thus, the divided images of the same original image 20 may be identified in the decoding apparatus 5.

The value notified from the decoders 53 through 57 to the decoder 51 may be a PTS value or a PCR in addition to the STC value of the next vertical synchronizing signal. When all TS streams received by the decoders 51 through 57 are multicast, the decoder 51 does not receive the notification of the PTS value or the PCR from the decoders 53 through 57, but the TS stream addressed to other decoders 53 through 57 is not decoded but received only, and the PTS value or the PCR value is extracted from the stream, thereby calculating the offset value of the STC.

All examples and conditional language provided herein are intended for the pedagogical purposes of aiding the reader in understanding the invention and the concepts contributed by the inventor to further the art, and are to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An encoding apparatus, comprising:
a master encoder and at least one slave encoder, wherein:
the master encoder is configured to
  obtain in time series one of divided images obtained by dividing an original image into a plurality of sections;
  obtain identification time for identification of the divided image obtained in time series, and notify the slave encoder of the identification time;
  encode the obtained divided image and generate an encoded divided image, and generate encoding transmission information including in time series encoding information including the encoded divided image and the identification time; and
  transmit the encoding transmission information; and
at least one of the slave encoder is configured to
  obtain in time series any other than the one of divided image;
  obtain the identification time set for identification of the divided image from the master encoder;
  encode the obtained divided image and generate an encoded divided image, and generate encoding transmission information including in time series encoding information including the encoded divided image and the identification time; and
  transmit the encoding transmission information.

2. The encoding apparatus according to claim 1, wherein:
the identification time is obtained by adding a period of a vertical synchronizing signal of the divided image to time at which the master encoder obtains the vertical synchronizing signal; and
the slave encoder sets time at which a next vertical synchronizing signal is obtained in the notified identification time, such that encoding information based on the same original image includes same identification time.

3. The encoding apparatus according to claim 1, wherein:
the identification time is obtained by adding a period of a vertical synchronizing signal of the divided image to time at which the master encoder obtains the vertical synchronizing signal; and
the slave encoder sets time at which a next vertical synchronizing signal is obtained in the identification time when a number of time at which the time at which the next vertical synchronizing signal is obtained is different from the notified identification time by a prescribed threshold or more is greater than or equal to a specified number.

4. The encoding apparatus according to claim 1, wherein the encoding transmission information is transmitted over an IP network.

5. A decoding apparatus, comprising:
a master decoder and at least one slave decoder, wherein:
the master decoder is configured to
  obtain in time series encoding information including an encoded divided image obtained by encoding one of divided images obtained by dividing an original image into a plurality of sections and identification time for identification of the divided image;
  calculate master playback time at which the divided image subsequent to the obtained divided image is played back based on the identification time;
  obtain slave playback time respectively at which the divided image subsequent to the divided image having the identification time calculated based on the identification time and obtained by the at least one slave decoder;
  set a latest time as playback time in the master playback time and at least one slave playback time;
  notify the at least one slave decoder of the playback time;
  decode the encoded divided image; and
  play back the decoding divided image based on the playback time and the identification time; and
the slave decoder is configured to
  obtain in time series encoding information including an encoded divided image obtained by encoding any divided image other than a divided image decoded by the master decoder in the divided images of the original image, and identification time for identification of the divided image;
  obtain slave playback time at which a divided image subsequent to the divided image corresponding to the identification time and obtained by the slave decoder;
  notify the master decoder of the slave playback time;
  obtain playback time of the subsequent divided image from the master decoder;
  decode the encoded divided image; and
  play back the decoding divided image based on the playback time and the identification time.

6. The decoding apparatus according to claim 5, wherein:
the playback time is obtained by adding a period of a vertical synchronizing signal of the divided image to time at which the master decoder obtains the vertical synchronizing signal; and
the slave decoder sets time at which a next vertical synchronizing signal is obtained in the notified playback time, such that the divided image based on the same original image is played back.

7. The decoding apparatus according to claim 5, wherein:
the playback time is obtained by adding a period of a vertical synchronizing signal of the divided image to time at which the master encoder obtains the vertical synchronizing signal; and
the slave decoder sets time at which a next vertical synchronizing signal is obtained in the playback time when a number of time at which the time at which the next vertical synchronizing signal is obtained is different from the notified playback time by a prescribed threshold or more is greater than or equal to a specified number of times.

8. The decoding apparatus according to claim 5, wherein the encoding information is obtained over an IP network.

9. An encoding method, comprising:
obtaining, by a master encoder, in time series one of divided images obtained by dividing an original image into a plurality of sections, and identification time at which the divided image is identified;

notifying, by the master encoder, a slave decoder of the identification time;

generating, by the master encoder, an encoded divided image by encoding the divided image, and encoding transmission information including in time series encoding information including the encoded divided image and the identification time;

obtaining, by the slave encoder, any of divided images other than the one divided image, and obtaining from the master decoder the identification time set for identification of the divided image; and generating, by the slave encoder, an encoded divided image obtained by encoding the obtained divided image, and generating encoding transmission information including in time series encoding information including the encoded divided image and the identification time.

10. The encoding method according to claim 9, wherein:
the identification time is obtained by adding a period of a vertical synchronizing signal of the divided image to time at which the master encoder obtains the vertical synchronizing signal; and the slave encoder sets time at which a next vertical synchronizing signal is obtained in the notified identification time, such that encoding information based on the same original image includes same identification time.

11. The encoding method according to claim 9, wherein:
the identification time is obtained by adding a period of a vertical synchronizing signal of the divided image to time at which the master encoder obtains the vertical synchronizing signal; and the slave encoder sets time at which a next vertical synchronizing signal is obtained in the identification time when a number of time at which the time at which the next vertical synchronizing signal is obtained is different from the notified identification time by a prescribed threshold or more is greater than or equal to a specified number of times.

12. The encoding method according to claim 9, wherein the encoding transmission information is transmitted over an IP network.

13. A decoding method, comprising:
obtaining, by a master decoder, in time series encoding information including an encoded divided image obtained by encoding one of divided images obtained by dividing an original image into a plurality of sections and identification time for identification of the divided image;

calculating, by the master decoder, master playback time at which the divided image subsequent to the obtained divided image is played back based on the identification time;

obtaining, by the master decoder, slave playback time at which the divided image subsequent to the divided image having the identification time calculated based on the identification time and obtained by the at least one slave decoder;

setting, by the master decoder, a latest time as playback time in the master playback time and at least one slave playback time;

notifying, by the master decoder, the at least one slave decoder of the playback time;

decoding, by the master decoder, the encoded divided image; and playing back, by the master decoder, the decoding divided image based on the playback time and the identification time;

obtaining, by a slave decoder, in time series encoding information including an encoded divided image obtained by encoding any divided image other than a divided image decoded by the master decoder in the divided images of the original image, and identification time for identification of the divided image;

obtaining, by the slave decoder, slave playback time at which a divided image subsequent to the divided image corresponding to the identification time and obtained by the slave decoder;

notifying, by the slave decoder, the master decoder of the slave playback time;

obtaining, by the slave decoder, playback time of the subsequent divided image from the master decoder;

decoding, by the slave decoder, the encoded divided image; and playing back, by the slave decoder, the decoded divided image based on the same original image.

14. The decoding method according to claim 13, wherein:
the playback time is obtained by adding a period of a vertical synchronizing signal of the divided image to time at which the master decoder obtains the vertical synchronizing signal; and the slave decoder sets time at which a next vertical synchronizing signal is obtained in the notified playback time, such that the divided image based on the same original image is played back.

15. The decoding method according to claim 13, wherein:
the playback time is obtained by adding a period of a vertical synchronizing signal of the divided image to time at which the master encoder obtains the vertical synchronizing signal; and the slave decoder sets time at which a next vertical synchronizing signal is obtained in the playback time when a number of time at which the time at which the next vertical synchronizing signal is obtained is different from the notified playback time by a prescribed threshold or more is greater than or equal to a specified number of times.

16. The decoding method according to claim 13, wherein the encoding information is obtained over an IP network.

* * * * *